United States Patent
Yamaguchi et al.

(10) Patent No.: US 10,268,429 B2
(45) Date of Patent: Apr. 23, 2019

(54) DEVICE AND METHOD FOR MANAGING PRINTER BASED ON TIME-RELATED DELETION CONDITION

(71) Applicant: FUJITSU LIMITED, Kawasaki-shi, Kanagawa (JP)

(72) Inventors: Tetsuhiro Yamaguchi, Yokohama (JP); Junki Hakamata, Yokohama (JP); Etsushi Fujita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/938,831

(22) Filed: Mar. 28, 2018

(65) Prior Publication Data
US 2018/0293033 A1    Oct. 11, 2018

(30) Foreign Application Priority Data
Apr. 11, 2017    (JP) .................. 2017-077889

(51) Int. Cl.
*G06F 15/00* (2006.01)
*G06F 3/12* (2006.01)
*G06K 1/00* (2006.01)

(52) U.S. Cl.
CPC ............ *G06F 3/126* (2013.01); *G06F 3/1203* (2013.01); *G06F 3/1204* (2013.01); *G06F 3/1218* (2013.01); *G06F 3/1229* (2013.01); *G06F 3/1267* (2013.01); *G06F 3/1285* (2013.01); *G06F 3/1296* (2013.01); *G06F 3/1274* (2013.01)

(58) Field of Classification Search
CPC ...... G06F 3/126; G06F 3/1203; G06F 3/1218; G06F 3/1229; G06F 3/1285; G06F 3/1296

USPC .............. 358/1.15, 1.14, 1.13, 1.1
See application file for complete search history.

(56) References Cited

U.S. PATENT DOCUMENTS

2006/0170964 A1* 8/2006 Matsuda ............ H04N 1/32619
                                                        358/1.15
2013/0014112 A1* 1/2013 Nishida .................. G06F 3/1204
                                                        718/100
2013/0070281 A1    3/2013 Utsumi

FOREIGN PATENT DOCUMENTS

| JP | 2009-237841 | 10/2009 |
| JP | 2013-067028 | 4/2013 |
| JP | 2013-105417 | 5/2013 |
| JP | 2014-178908 | 9/2014 |

* cited by examiner

*Primary Examiner* — Douglas Q Tran
(74) *Attorney, Agent, or Firm* — Fujitsu Patent Cneter

(57) ABSTRACT

A printing management device includes a memory and a processor coupled to the memory. The processor is configured to receive a printing output request from a terminal. The printing output request requests to print output data without specifying a printer to be used. The processor is configured to transmit the printing output request to a specific printer in association with a time-related deletion condition to cause the specific printer to delete the printing output request from a first memory of the specific printer when a time period set in the time-related deletion condition is exceeded. The processor is configured to retransmit the printing output request to the specific printer when a retransmission request for requesting retransmission of the printing output request is received from the specific printer.

20 Claims, 21 Drawing Sheets

FIG. 4

| USER ID | PRINTING JOB ID | FILE NAME | REGISTRATION DATE AND TIME | STORAGE LOCATION |
|---|---|---|---|---|
| U001 | G111 | test3.txt | 2016/08/04 09:00:00 | E:¥job¥test3.txt |
| U002 | G112 | test2.txt | 2016/08/04 12:00:00 | E:¥job¥test2.txt |
| ... | ... | ... | ... | ... |
| U003 | G120 | test1.txt | 2016/08/04 18:00:00 | E:¥job¥test1.txt |

FIG. 5

| PRINTING EXECUTION DATE AND TIME | USER ID | CLIENT IP | OUTPUT TARGET PRINTER | PRINTING JOB ID |
|---|---|---|---|---|
| 2016/09/01 16:56:10 | U003 | 10.xx.xx.1 | PRINTER B | G001 |
| 2016/09/03 09:25:44 | U003 | 10.xx.xx.1 | PRINTER A | G002 |
| 2016/09/03 13:05:92 | U003 | 10.xx.xx.2 | PRINTER A | G003 |
| 2016/09/04 10:15:11 | U001 | 10.xx.xx.2 | PRINTER A | G004 |
| 2016/09/04 15:33:11 | U002 | 10.xx.xx.1 | PRINTER A | G004 |
| 2016/09/04 20:15:11 | U002 | 10.xx.xx.3 | PRINTER C | G006 |

FIG. 6

| PRINTER | USAGE AMOUNT | STORAGE CAPACITY | USAGE RATE |
|---|---|---|---|
| PRINTER A | 180 | 200 | 90% |
| PRINTER B | 100 | 200 | 50% |
| PRINTER C | 95 | 100 | 95% |

FIG. 7

| USAGE RATE | DELETION TIME PERIOD (MIN.) |
|---|---|
| 95% OR GREATER | 1 |
| 90% OR GREATER, LESS THAN 95% | 2 |
| 80% OR GREATER, LESS THAN 90% | 5 |
| 80% OR LESS | 30 |

FIG. 8

PRINTING LOG TABLE

| PRINTING EXECUTION DATE AND TIME | USER ID | CLIENT IP | OUTPUT TARGET PRINTER | PRINTING JOB ID |
|---|---|---|---|---|
| 2016/09/01 16:56:10 | U003 | 10.xx.xx.1 | PRINTER B | G001 |
| 2016/09/03 09:25:44 | U003 | 10.xx.xx.1 | PRINTER A | G002 |
| 2016/09/03 13:05:92 | U003 | 10.xx.xx.2 | PRINTER A | G003 |
| 2016/09/04 10:15:11 | U001 | 10.xx.xx.2 | PRINTER A | G004 |
| 2016/09/04 15:33:11 | U002 | 10.xx.xx.1 | PRINTER A | G005 |
| 2016/09/04 20:15:11 | U002 | 10.xx.xx.3 | PRINTER C | G006 |

FIRST EXTRACTED DATA

| PRINTING EXECUTION DATE AND TIME | USER ID | CLIENT IP | OUTPUT TARGET PRINTER | PRINTING JOB ID |
|---|---|---|---|---|
| 2016/09/01 16:56:10 | U003 | 10.xx.xx.1 | PRINTER B | G001 |
| 2016/09/03 09:25:44 | U003 | 10.xx.xx.1 | PRINTER A | G002 |
| 2016/09/03 13:05:92 | U003 | 10.xx.xx.2 | PRINTER A | G003 |

FIG. 9

SECOND EXTRACTED DATA

| USER ID | PRINTING JOB ID | FILE NAME | REGISTRATION DATE AND TIME | STORAGE LOCATION |
|---|---|---|---|---|
| U003 | G001 | test1.txt | 2016/09/01 16:53:10 | E:¥job¥test3.txt |
| U003 | G002 | test2.txt | 2016/09/03 09:23:44 | E:¥job¥test2.txt |
| U003 | G003 | test3.txt | 2016/09/03 13:01:92 | E:¥job¥test1.txt |

↓ USE PRINTING JOB ID TO ASSOCIATE WITH FIRST EXTRACTED DATA

TIME PERIOD DATA FROM REGISTRATION TO PRINTING

| PRINTING JOB ID | REGISTRATION DATE AND TIME | PRINTING EXECUTION DATE AND TIME | TIME PERIOD FROM REGISTRATION TO PRINTING (MIN.) |
|---|---|---|---|
| G001 | 2016/09/01 16:53:10 | 2016/09/01 16:56:10 | 3 |
| G002 | 2016/09/03 09:23:44 | 2016/09/03 09:25:44 | 2 |
| G003 | 2016/09/03 13:01:92 | 2016/09/03 13:05:92 | 1 |

↓

AVERAGE TIME PERIOD = (3+2+1)/3 = 2 MIN.

PRINTING JOB MANAGEMENT TABLE

| USER ID | PRINTING JOB ID | FILE NAME | REGISTRATION DATE AND TIME | STORAGE LOCATION |
|---|---|---|---|---|
| U001 | G001 | test1.txt | 2016/09/01 16:53:10 | E:¥job¥test3.txt |
| U002 | G002 | test2.txt | 2016/09/03 09:23:44 | E:¥job¥test2.txt |
| U003 | G003 | test3.txt | 2016/09/03 13:01:92 | E:¥job¥test1.txt |

PRINTING OUTPUT REQUEST

| USER ID | PRINTING JOB ID | FILE NAME | REGISTRATION DATE AND TIME | DELETION DEADLINE |
|---|---|---|---|---|
| U003 | G003 | test3.txt | 2016/09/03 13:01:92 | 2016/09/03 13:16:92 |

FIG. 12

| USER ID | PRINTING JOB ID | FILE NAME | REGISTRATION DATE AND TIME | DELETION DEADLINE | STORAGE LOCATION |
|---|---|---|---|---|---|
| U001 | A1 | test11.txt | 2016/10/01 12:01:00 | 2016/10/01 12:16:00 | X:xxx/xxx/test11.txt |
| U001 | A2 | test12.txt | 2016/10/01 12:05:00 | 2016/10/01 12:20:00 | X:xxx/xxx/test12.txt |
| U001 | A3 | test13.txt | 2016/10/01 12:07:00 | 2016/10/01 12:22:00 | X:xxx/xxx/test13.txt |
| U002 | A4 | test14.txt | 2016/10/01 12:10:00 | 2016/10/01 13:10:00 | X:xxx/xxx/test14.txt |
| U003 | A5 | test15.txt | 2016/10/01 12:10:00 | — | X:xxx/xxx/test15.txt |

DEVICE AND METHOD FOR MANAGING PRINTER BASED ON TIME-RELATED DELETION CONDITION

CROSS-REFERENCE TO RELATED APPLICATION

This application is based upon and claims the benefit of priority of the prior Japanese Patent Application No. 2017-77889, filed on Apr. 11, 2017, the entire contents of which are incorporated herein by reference.

FIELD

The embodiment discussed herein relates to a printing management method, a printing management device, and a non-transitory computer-readable recording medium having stored therein a program.

BACKGROUND

A system is used which causes a server to store printing data received from a terminal and transmit a printing instruction based on the printing data to a predetermined printer.

As related art, a technique has been provided in which an information processing device stores jobs for which a holding period can be set, determines whether the holding period set for the job has elapsed or not, and if it is determined that the holding period has elapsed, delete the job for which the holding period has elapsed from a job storage unit.

Related techniques are disclosed in, for example, Japanese Laid-open Patent Publication No. 2014-178908, Japanese Laid-open Patent Publication No. 2013-105417, Japanese Laid-open Patent Publication No. 2013-67028, and Japanese Laid-open Patent Publication No. 2009-237841.

When the server transmits a printing output request to a printer in response to receiving the printing output request including printing data and the like from a terminal, the printer stores the printing output request. The printer then prints based on the stored printing output request when the printer is made to perform a printing execution operation.

When a time-related deletion condition is set in the printing output request, the printing output request is deleted from the storage device of the printer when the time period set in the deletion condition has elapsed. If the time period set in the deletion condition is long, the accumulation load of the printer increases because there are multiple printing output requests stored in the storage device of the printer.

When the time period set in the deletion condition is short, there is a possibility that the printing output request to be printed has been deleted from the printer when a user or the like performs printing with the printer. When the printing output request is deleted, the user or the like is expected to use the terminal to perform the printing operation again. Therefore, the convenience of the user or the like is decreased.

SUMMARY

According to an aspect of the present invention, provided is a printing management device including a memory and a processor coupled to the memory. The processor is configured to receive a printing output request from a terminal. The printing output request requests to print output data without specifying a printer to be used. The processor is configured to transmit the printing output request to a specific printer in association with a time-related deletion condition to cause the specific printer to delete the printing output request from a first memory of the specific printer when a time period set in the time-related deletion condition is exceeded. The processor is configured to retransmit the printing output request to the specific printer when a retransmission request for requesting retransmission of the printing output request is received from the specific printer.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is an example of a printing job management table;

FIG. 5 is an example of a printing log table;

FIG. 6 is an example of a printer storage unit usage status table;

FIG. 7 is an example of a deletion time period reference table;

FIG. 8 is a view for illustrating an example of calculating the time period from registration until printing;

FIG. 9 is a view for illustrating an example of calculating the time period from registration until printing;

FIG. 12 is an example of a printing job table stored by a printer;

DESCRIPTION OF EMBODIMENT (Example of overall configuration of system according to an embodiment)

Figure 1:
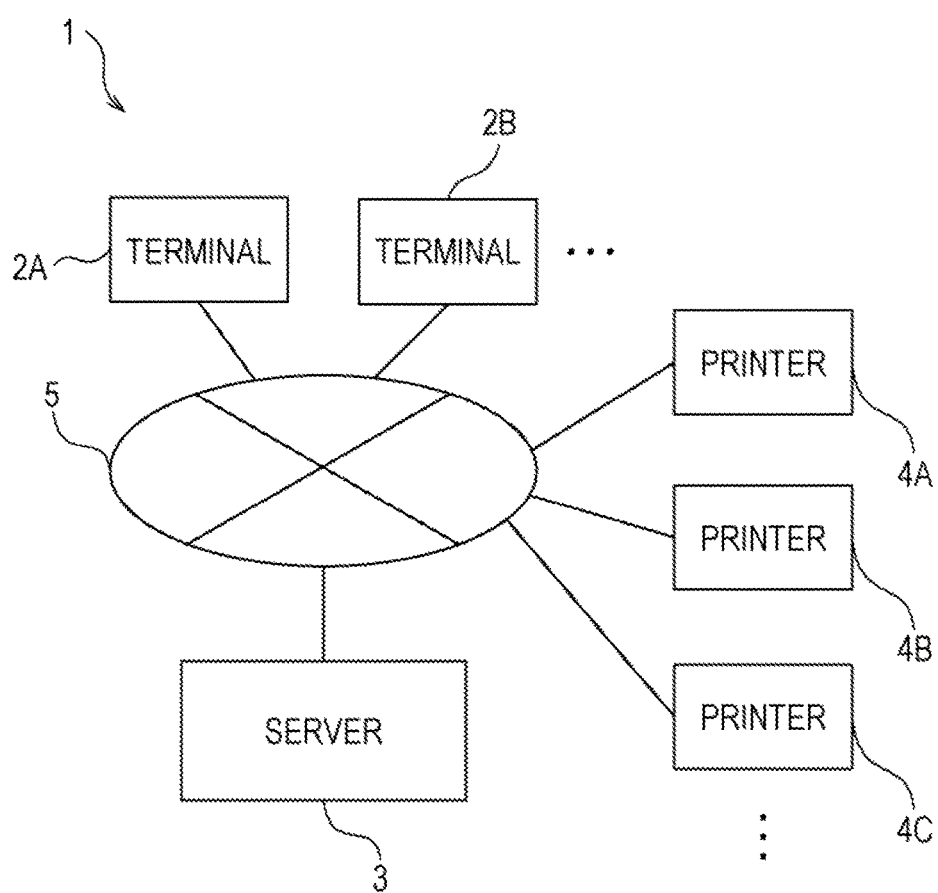
FIG. 1 is an example of a printing system.

FIG. 1 is an example of a printing system 1 according to an embodiment. In the printing system 1, a plurality of terminals 2 (2A, 2B, . . . ), a server 3, and a plurality of printers 4 (4A, 4B, 4C, . . . ) are connected to each other over a network 5.

A terminal 2 is, for example, a predetermined terminal operated by a user or the like. For example, the terminal 2 may be a personal computer, a tablet terminal, or a smartphone and the like. The terminal 2 may also be a thin client terminal having a small number of hardware resources.

The terminal 2 accepts an operation for executing a predetermined printing from a user or the like and transmits a printing output request including printing data and the like to the server 3 via the network 5.

Hereinbelow, it is assumed that the printing output request transmitted by the terminal 2 to the server 3 does not specify a target printer 4 for outputting the printing output request. Moreover, it is assumed that the printing output request does not include a user identification (ID) for identifying the user.

For example, when the terminal 2 accepts a login operation by the user, the user ID is identified from the login operation. When the terminal 2 accepts an operation (referred to below as a printing instruction operation) pertaining to a printing instruction for performing predetermined printing, the terminal 2 transmits the printing output request including the printing data and the user ID to the server 3.

When the server 3 receives the printing output request from the terminal 2, the server 3 specifies a target printer 4 for outputting the printing output request and transmits the printing output request, to which a time-related deletion condition has been added, to the specified printer 4 (referred to below as output printer 4). The output printer 4 is an example of a specific printer.

The server 3 may also transmit the printing output request received from the terminal 2 to a plurality of printers 4. When transmitting the printing output request to a plurality of printers 4, the plurality of printers 4 are specified as output printers 4.

The printer 4 stores the received printing output request in a storage device of the printer 4. When the printer 4 is caused to perform the operation for printing the printing output request (referred to below as a printing execution operation), the printer 4 performs the printing based on the printing output request stored in the storage device.

The network 5 may be a local area network (LAN), a wide area network (WAN), or the like, or may be an internet network or the like.

For example, as a result of a user performing a printing execution operation on the output printer 4, the output printer 4 acquires the printing output request from the server 3 and performs the printing based on the acquired printing output request.

In the above case, the output printer 4 acquires the printing output request from the server 3 after the output printer 4 has been made to perform the printing execution operation, thereby generating a wait time period from the time that the printing execution operation is performed until the printing is performed.

The server 3 performs predetermined processing in response to receiving the printing output request from the terminal 2 and sends the printing output request to the output printer 4. Therefore, when the user performs the printing execution operation on the output printer 4, the printing output request to be printed is already stored in storage device of the output printer 4.

In the above case, the output printer 4 does not acquire the printing output request from the server 3 after accepting the printing execution operation and reads the printing output request from the storage device to perform the printing, whereby the above wait time period does not occur. That is, because the server 3 previously transmits the printing output request to the output printer 4, the above wait time period does not occur.

Therefore, the time period from the terminal 2 accepting the printing execution instruction until the output printer 4 performs the printing is shortened. Because the time period is shortened, the user that performs the printing execution operation on the output printer 4 is able to obtain the printed matter earlier.

As indicated above, the server 3 specifies the output printer 4 in response to receiving the printing output request from the terminal 2, and transmits the printing output request to which the deletion condition pertaining to a time period has been added, to the specified output printer 4. The output printer 4 stores the received printing output request in a storage device.

The printer 4 may receive multiple printing output requests from the server 3. When the printer 4 receives multiple printing output requests, the multiple printing output requests are stored in the storage device of the printer 4. When multiple printing output requests are stored in the storage device of the printer 4, the accumulation load of the storage device increases.

As indicated above, the server 3 transmits the printing output request to which the deletion condition pertaining to a time period is added, to the specified output printer 4. The output printer 4 deletes the printing output request from the storage device in accordance with the time period set in the deletion condition of the printing output request.

The time period in which the printing output requests remain in the storage device of the output printer 4 increases in accordance with a longer time period set in the deletion condition of the printing output request. When the time period in which the printing output requests remain in the storage device of the output printer 4 increases, the accumulation load of the storage device of the printer 4 increases.

Furthermore, a case of the printing output requests being stored for a long time period in the storage device of the printer 4 is not desirable from the point of view of security. For example, it is not desirable that a printing output request including printing data pertaining to confidential information is stored in the storage device of the printer 4 for a long time period.

The printing output request is deleted within a shorter time period from the storage device of the printer 4 in accordance with a reduction in the time period set in the deletion condition of the printing output request. When the printing output request is deleted in a short time period, there is a possibility that a printing output request to be printed is deleted when the user performs the printing execution operation using the output printer 4.

If the printing output request is deleted from the storage device of the printer 4, the user uses the terminal 2 again to perform the printing instruction operation, and the output printer 4 acquires the printing output request from the server 3. As a result, the output printer 4 performs the printing based on the printing output request.

However in the above case, the user is forced to perform the printing instruction operation again whereby the convenience of printing using the printing system 1 is reduced.

The following matters discuss improving the convenience when a printer 4 receives a printing output request to which a time-related deletion condition has been added.

(Example of Server)

Figure 2:
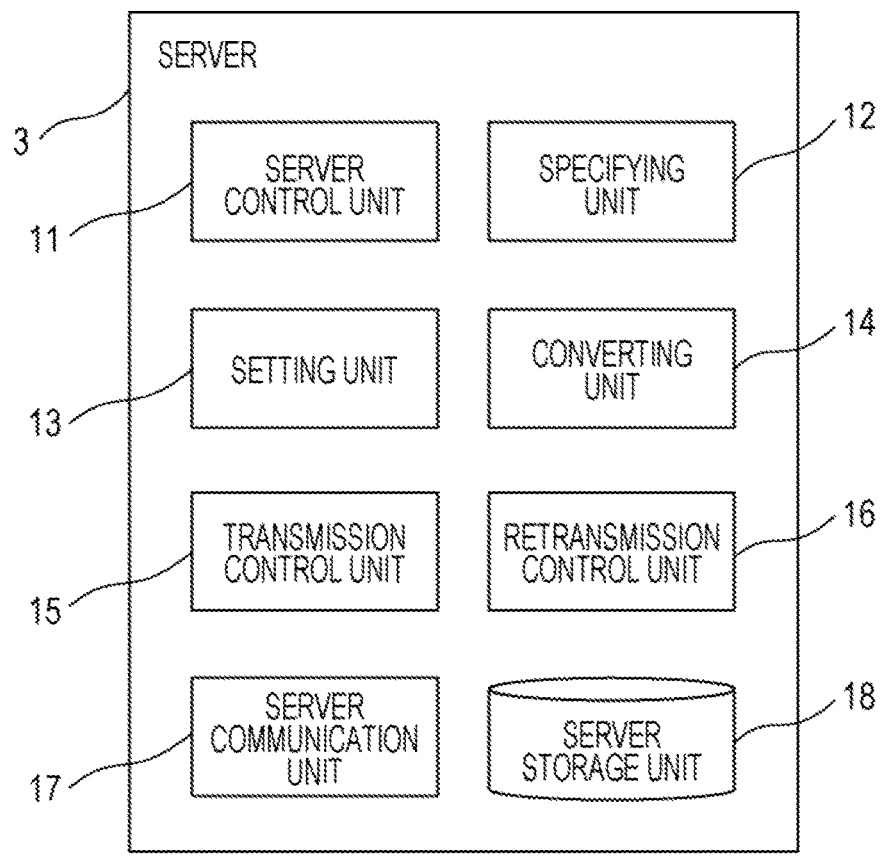
FIG. 2 is an example of a server.

FIG. 2 is an example of the server 3. The server 3 includes a server control unit 11, a specifying unit 12, a setting unit 13, a converting unit 14, a transmission control unit 15, a retransmission control unit 16, a server communication unit 17, and a server storage unit 18. The server control unit 11 performs multiple types of controls.

The specifying unit 12 specifies a target output printer 4 for transmitting the printing output request received from the terminal 2. The setting unit 13 sets a time-related deletion condition in the printing output request transmitted to the specified output printer 4. The converting unit 14 converts the printing data included in the printing output request to a format conforming to the output printer 4 specified by the specifying unit 12.

The transmission control unit 15 controls transmissions from the server 3. For example, the transmission control unit 15 controls the transmission of the printing output request to the printer 4 specified by the specifying unit 12, and controls the holding of the data of the printing output request. The transmission control unit 15 holds (stores) the data of the printing output request in the server storage unit 18.

In response to a retransmission demand (output instruction) from the printer 4, the retransmission control unit 16 controls the transmission of the printing output request stored in the server storage unit 18 to the printer 4 that initiated the demand.

The server communication unit 17 communicates with the terminals 2 and the printer 4 over the network 5. The server communication unit 17 is an example of a communication unit. The server storage unit 18 stores various types of information. The server storage unit 18 stores the printing output request received from the terminal 2. The server storage unit 18 is an example of a printing management device storage unit.

The storage capacity of the server storage unit 18 is assumed to be large. In the embodiment, the storage capacity of the server storage unit 18 in the server 3 is assumed to be larger than the storage capacity of the storage device in each printer 4. Printing output requests accepted from a plurality of the terminals 2 are assumed to be stored for a long time period in the server storage unit 18. The server storage unit 18 is under the management of the server 3 and therefore is safe with regards to security issues.

Because the storage capacity of the server storage unit 18 is large, the accumulation load of the server storage unit 18 does not become too high even when the printing output requests are stored in the server storage unit 18 for a long time period. As described above, the time-related deletion condition is added to the printing output request transmitted from the server 3 to the printer 4.

The printing output request is assumed to be stored in the server storage unit 18 for a time period longer than the time period set in the deletion condition of the printing output request. Therefore, when the server 3 receives a retransmission demand pertaining to the printing output request, the server 3 is able to transmit the printing output request stored in the server storage unit 18 to the printer 4.

(Example of Printer)

Figure 3:
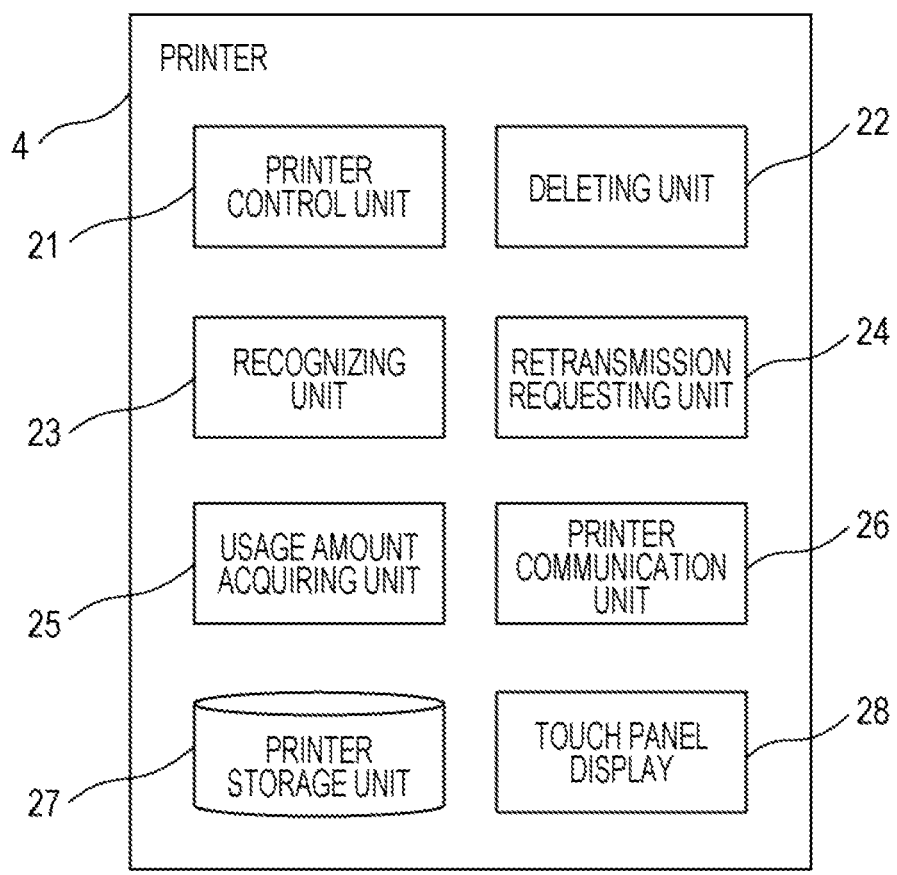
FIG. 3 is an example of a printer.

FIG. 3 is an example of the printer 4. The printer 4 includes a printer control unit 21, a deleting unit 22, a recognizing unit 23, a retransmission requesting unit 24, a usage amount acquiring unit 25, a printer communication unit 26, a printer storage unit 27, and a touch panel display 28.

The printer control unit 21 performs various types of controls of the printer 4. For example, the printer control unit 21 controls a printing mechanism built into the printer 4. The printing mechanism is controlled whereby printing is performed on a predetermined type of paper (sheet for printing and the like).

The deleting unit 22 deletes a printing output request that has exceeded the time period set by the deletion condition among one or more printing output requests stored in the printer storage unit 27. Hereinbelow, the time period set in the deletion condition is referred to as a deletion deadline.

The recognizing unit 23 recognizes whether a user operating the printer 4 has proper permission (user recognition) and recognizes a user ID for identifying the user operating the printer 4.

For example, when a card reader is provided on the printer 4, the card reader may carry out near field wireless communication with a non-contact type reader of the user, and the recognizing unit 23 may recognize the user ID. Moreover, when a touch panel display 28 accepts the input of the user ID, the recognizing unit 23 may recognize the user ID based on the accepted user ID.

The retransmission requesting unit 24 transmits, to the server 3, a retransmission demand for demanding retransmission of the printing output request if the printing output request corresponding to a printing execution operation on the printer 4 has been deleted from the printer storage unit 27.

The usage amount acquiring unit 25 acquires, from the printer storage unit 27, information pertaining to an information amount (usage amount) stored in the printer storage unit 27. The usage amount acquiring unit 25 may acquire information pertaining to an available capacity (=storage capacity of printer storage unit 27−usage amount) of the printer storage unit 27.

The printer communication unit 26 communicates with the server 3 over the network 5. The printer communication unit 26 may also communicate with the terminals 2 over the network 5.

The printer storage unit 27 is an abovementioned storage device of the printer 4 and stores the printing output requests received from the server 3. The printer control unit 21, for example, accepts the printing execution operation performed on the touch panel display 28, reads out the printing output request corresponding to the printing execution operation from the printer storage unit 27, and executes the printing.

The touch panel display 28 includes a display function and an input function. The display function and the input function may be realized by separate devices. For example, the display function may be realized by a display, and the input function may be realized by a push key or the like.

(Examples of Various Types of Data)

FIG. 4 is an example of a printing job management table stored in the server storage unit 18 of the server 3. The printing job management table exemplified in FIG. 4 includes headings for the user ID, a printing job ID, a file name, a registration date and time, and a storage location.

As indicated above, the printing data and the user ID are included in the printing output request transmitted by the terminal 2 to the server 3. The server control unit 11 adds a record pertaining to the user ID included in the printing output request to the printing job management table.

The server control unit 11 adds records to the printing job management table based on the received printing output request. Hereinbelow, the printing output request may be referred to as a printing job. The user ID indicates the user ID included in the printing output request received from the terminal 2.

The printing job ID represents an identifier attached to the printing output request by the server control unit 11. The file name represents the file name of the printing data included in the printing output request. The registration date and time represents the date and time that the server 3 accepted the printing output request from the terminal 2.

The storage location represents the storage location of the printing output request in the printer storage unit 27. The shaded areas in FIG. 4 represent examples of records added to the printing job management table based on the printing output request received by the server 3.

FIG. 5 is an example of a printing log table stored in the server storage unit 18 of the server 3. The example of the printing log table in FIG. 5 includes headers such as a printing execution date and time, the user ID, a client Internet protocol (IP), an output target printer, and the printing job ID.

The printing execution date and time indicates the date and time that the printing output request of the printing job ID corresponding to the printing execution date and time was printed by the output printer 4 corresponding to the output target printer.

For example, when the printer 4 that represents the above output target printer has executed the printing based on the printing output request of the printing job ID, the printer 4 may transmit information pertaining to the date and time that the printing was executed to the server 3. The server control unit 11 may store the information pertaining to the date and time under the heading of the printing execution date and time in the printing log table in response to the server 3 receiving the information.

The user ID represents the abovementioned user ID. The client IP is the IP address of the terminal 2. The terminal 2 is identified by the client IP. The output target printer represents the printer 4 that is the target to which the printing output request is transmitted. The printing job ID represents the abovementioned printing job ID.

As indicated above, the server 3 receives, from the terminal 2, the printing output request in which the output printer 4 that is the target of the transmission of the printing output request is not specified. The specifying unit 12 specifies the output printer 4.

As exemplified in FIG. 5, the printing log table represents output history information which indicates the history of which printer 4 among the printers 4 outputs the printing output request. The specifying unit 12 refers to the printing log table and specifies the output printer 4.

For example, the specifying unit 12 may refer to the printing log table, may calculate the usage rates of the printers 4, and may specify the output printer 4 based on the usage rates. The processing for specifying the output printer 4 based on the usage rates is referred to below as first output printer specification processing. The usage rate represents the usage rate of a target printer 4 to which the server 3 transmits the printing output request among the printers 4.

In the example in FIG. 5, the printer A has four records among the six records in the printing log table. Therefore, the usage rate of the printer A is about 67%. The usage rates of the printer B and the printer C are each about 33%.

For example, in the case of the examples illustrated in FIG. 5, the specifying unit 12 may refer to the printing log table and may specify the printer A having the highest usage rate as the output printer 4. The printer 4 having the highest usage rate is assumed to be the printer 4 having a high usage frequency.

For example, a normally used printer 4 and a rarely used printer 4 may be present among the plurality of printers 4 installed in an office. Because the printer 4 having the highest usage rate is thought to be the normally used printer 4, the specifying unit 12 may specify the printer 4 having the highest usage rate as the output printer 4.

The specifying unit 12 may refer to the printing log table and may calculate the usage rates of the printers 4 for each terminal 2 based on the output target printers corresponding to the client IPs of the terminals 2, and specify the output printer 4 based on the calculated usage rates.

The processing for specifying the output printer 4 based on the usage rates is referred to below as second output printer specification processing. The usage rates are obtained based on the information of the output target printer that is the target of the transmission from the server 3 of the printing output request received from the terminal 2.

The terminal 2 is specified based on the client IP in the printing log table. The terminal 2 may be specified with a method other than the IP address.

The output target printers corresponding to the terminal 2 having the client IP of "10.xx.xx.1" in the printing log table exemplified in FIG. 5, are the printer A and the printer B.

The history of the printer A indicates that printing output requests were transmitted twice, and the history of the printer B indicates that a printing output request was transmitted once. Therefore, the usage rate the printer A used by the terminal 2 having the client IP of "10.xx.xx.1" using is about 67%, and the usage rate of the printer B used by the terminal 2 having the client IP of "10.xx.xx.1" is about 33%.

The specifying unit 12 may specify the printer A having the highest usage rate among the printers 4 corresponding to the terminal 2, as the output printer 4. For example, the printing output requests transmitted from the terminal 2 to the server 3 may be transmitted in a concentrated manner to a specific printer 4 among the plurality of printers 4. That is, the specific printer 4 is the printer 4 having the highest usage rate corresponding to the terminal 2.

The printing log table exemplified in FIG. 5 indicates that the terminal 2 having the client IP of "10.xx.xx.1" frequently uses the printer A. Therefore, the specifying unit 12 may specify the printer A having the highest usage rate among the printers 4 corresponding to the terminal 2, as the output printer 4.

The specifying unit 12 may refer to the printing log table, may calculate the usage rates of the printers 4 corresponding to a user ID, and may specify the output printer 4 based on the usage rates. The processing for specifying the output printer 4 based on the usage rates is referred to below as third output printer specification processing. The usage rate represents the usage rate of the target printer 4 to which the server 3 transmits the printing output requests with regard to each user ID.

The output target printers corresponding to the user ID "U003" are the printer A and the printer B in the printing log table exemplified in FIG. 5. The history of the printer A indicates that printing output requests were transmitted twice, and the history of the printer B indicates that a printing output request was transmitted once.

Therefore, the usage rate of the printer A used by the user ID "U003" is about 67% and the usage rate of the printer B used by the user ID "U003" is about 33%. The specifying unit 12 may specify the printer A having the highest usage rate among the printers 4 corresponding to a user ID, as the output printer 4.

The printer 4 having the highest usage rate among the printers 4 which represent output target printers corresponding to a user ID, is thought to be the printer 4 normally used by a user specified by the user ID. Therefore, the specifying unit 12 may specify the printer A having the highest usage rate among the printers 4 corresponding to the user ID, as the output printer 4.

FIG. 6 is an example of a printer storage unit usage status table. The printer storage unit usage status table is a table pertaining to a usage status of the printer storage unit 27 of each printer 4 to which the server 3 transmits a printing output request.

For example, the server control unit 11 of the server 3 periodically collects information pertaining to the usage status of the printer storage unit 27 from each printer 4. The usage amount acquiring unit 25 of the printer 4 acquires information (for example, usage amount information) pertaining to the usage status of the printer storage unit 27 and the printer 4 transmits the acquired information to the server 3.

The server control unit 11 may update the printer storage unit usage status table based on the information pertaining to the above usage status of the printer storage unit 27 transmitted from each printer 4.

The printer storage unit usage status table includes headers such as the printer, the usage amount, the storage capacity, and the usage rate. The printer represents information specifying the printer 4. The storage capacity represents the storage capacity of the printer storage unit 27 corresponding to the printer 4. The usage rate represents the usage rate of the printer storage unit 27 corresponding to the printer 4.

Because the storage capacity of each printer 4 is already known, the server control unit 11 may derive the respective usage rates for each printer 4 based on the usage amount of the printer storage unit 27 collected from each printer 4.

For example, the server control unit 11 may derive the usage rate by dividing the usage amount of the printer storage unit 27 acquired from each printer 4 by the storage capacity of the printer storage unit 27, and may store the usage rate in the printer storage unit usage status table.

The specifying unit 12 may refer to the printer storage unit usage status table and specify the output printer 4 based on the usage rate of the printer storage unit 27 in each printer 4. The specification processing of the output printer 4 based on the usage rate is referred to below as fourth output printer specification processing.

For example, in the example in FIG. 6, the printer B has the lowest accumulation load among the printers A to C because the usage rate of the printer B is the lowest. Therefore, the specifying unit 12 may specify the printer B having the lowest accumulation load as the output printer 4. The accumulation loads can be distributed by transmitting the printing output request to the printer 4 with the lowest accumulation load.

The following matters discuss an example of the setting unit 13 setting a time-related deletion condition in the printing output request transmitted to the specified output printer 4. Hereinbelow, the deletion deadline is established as the date and time after the deletion time period has elapsed since the abovementioned registration date and time.

The setting unit 13 may set the deletion deadline set in the printing output request to a time after a predetermined time period from the abovementioned registration date and time.

For example, the setting unit 13 may set the deletion deadlines equally for all of the printing output requests to a predetermined time period after (for example, 15 minutes after) the registration date and time. Hereinbelow, the processing for setting, in the printing output request, a time from the registration date and time until after a predetermined time period as the deletion deadline is referred to as a first deletion condition setting processing.

The setting unit 13 may set the deletion deadline in the printing output request based on the usage status of the printer storage unit 27 of the output printer specified by the specifying unit 12. Hereinbelow, the processing for setting the deletion deadline based on the usage status of the printer storage unit 27 is referred to as second deletion condition setting processing.

FIG. 7 is an example of a deletion time period reference table used in the second deletion condition setting processing. The headings of the usage rates in the deletion time period reference table correspond to the headings of the usage rates in the printer storage unit usage status table.

As indicated above, the server control unit 11 periodically collects information pertaining to the usage amount of the printer storage unit 27 from each printer 4. The headings of the usage rates in the deletion time period reference table may also be updated based on information pertaining to the usage amounts of the printer storage units 27 collected periodically by the server control unit 11.

As indicated above, the deleting unit 22 of the printer 4 that is the output target deletes the printing output request from the printer storage unit 27 based on the deletion deadline set in the printing output request.

When the usage rate of the printer storage unit 27 of the printer 4 is high, the accumulation load of the printer storage unit 27 is also high. When the printing output request is transmitted to a printer storage unit 27 having a high accumulation load, the deletion deadline is desirably shorter.

Therefore, when adding the aforementioned deletion deadline to the printing output request, the setting unit 13 refers to the deletion time period reference table and sets the deletion deadline to be shorter in accordance with the high usage rate of the printer storage unit 27 in the output printer 4 that is the target of the printing output request transmission.

In the deletion time period reference table exemplified in FIG. 7, because the accumulation load is high when the usage rate of the printer storage unit 27 is 95% or greater, the deletion time period is set to the shortest time period of "1 min." However, because the accumulation load is not quite so high when the usage rate of the printer storage unit 27 is less than 80%, the deletion time period is set to the longest time period of "30 min." The relationship between the usage rates and the deletion times is not limited to the examples in FIG. 7.

The setting unit 13 may set the deletion time period set in the printing output request based on the history of the time period from when the server 3 accepts the printing output request until the printing is executed (referred to below as the time period from registration to printing).

The setting processing of the deletion condition based on the history of the time period from registration until printing for each user is referred to as third deletion condition setting processing. The third deletion condition setting processing is explained below.

In the example in FIG. 8, the setting unit 13 extracts a record of a specific user ID (assumed to be "U0003") from the printing log table. First extraction data represents an example of a record extracted from the printing log table. In the case exemplified in FIG. 8, three records corresponding to the user ID "U003"are extracted from the printing log table.

FIG. 9 is an example of data in which the above records corresponding to the user ID "U003"are extracted from the abovementioned printing job management table by the setting unit 13. In the case exemplified in FIG. 9, three records corresponding to the user ID "U003"are extracted from the printing job management table.

The setting unit 13 associates the first extraction data and the second extraction data with the printing job IDs and obtains data of three headings including the printing execution date and time, the registration date and time, and the time period from registration until printing for each printing job ID.

The setting unit 13 obtains the time period from registration until printing based on the time period difference between the registration date and time (date and time when the server 3 accepted the printing output request) and the printing execution date and time (date and time when printing based on the printing output request was executed by the printer 4).

In the example in FIG. 9, the time period of the printing job ID "G001"is "3 min", the time period of the printing job ID "G002"is "2 min", and the time period of the printing job ID "G003"is "1 min".

The setting unit 13 may calculate the average time period from registration until printing for each printing job ID and may set the calculated average time period as the above deletion time period. In the case of the example in FIG. 9, the deletion time set by the setting unit 13 is "2 min" which is the above average time.

Therefore, the deletion time is set based on the history of the time period from registration until printing for each user, whereby the deletion time period is set corresponding to the characteristics of the users. The setting unit 13 sets the date and time from the registration date and time until after the deletion time period as the deletion deadline in the printing output request.

Figure 10:
FIG. 10 is an example of a printing output request transmitted by a printer.

FIG. 10 is an example of a printing output request transmitted from the server 3 to the output printer 4. When the specifying unit 12 specifies the output printer 4 and the setting unit 13 sets the deletion deadline in the printing output request, the transmission control unit 15 holds the data of the applicable printing output request in the server storage unit 18 and transmits the applicable printing output request to the specified output printer 4.

In the example in FIG. 10, the transmission control unit 15 transmits the printing output request based on the record (shaded record in FIG. 10) of the printing job ID "003"from the printing job management table.

The printing output request transmitted from the server 3 to the output printer 4 in the example in FIG. 10 includes the user ID, the printing job ID, the file name, the registration date and time, and the deletion deadline. The printing output request may not include the printing job ID or the registration date and time among the above headings.

Within the printing output request example in FIG. 10, the deletion deadline represents the date and time after the deletion time period set by the setting unit 13 in the printing output request has elapsed, based on the registration date and time. Therefore, when the deletion deadline elapses, the above printing output request is deleted from the printer storage unit 27 of the output printer 4.

Figure 11:
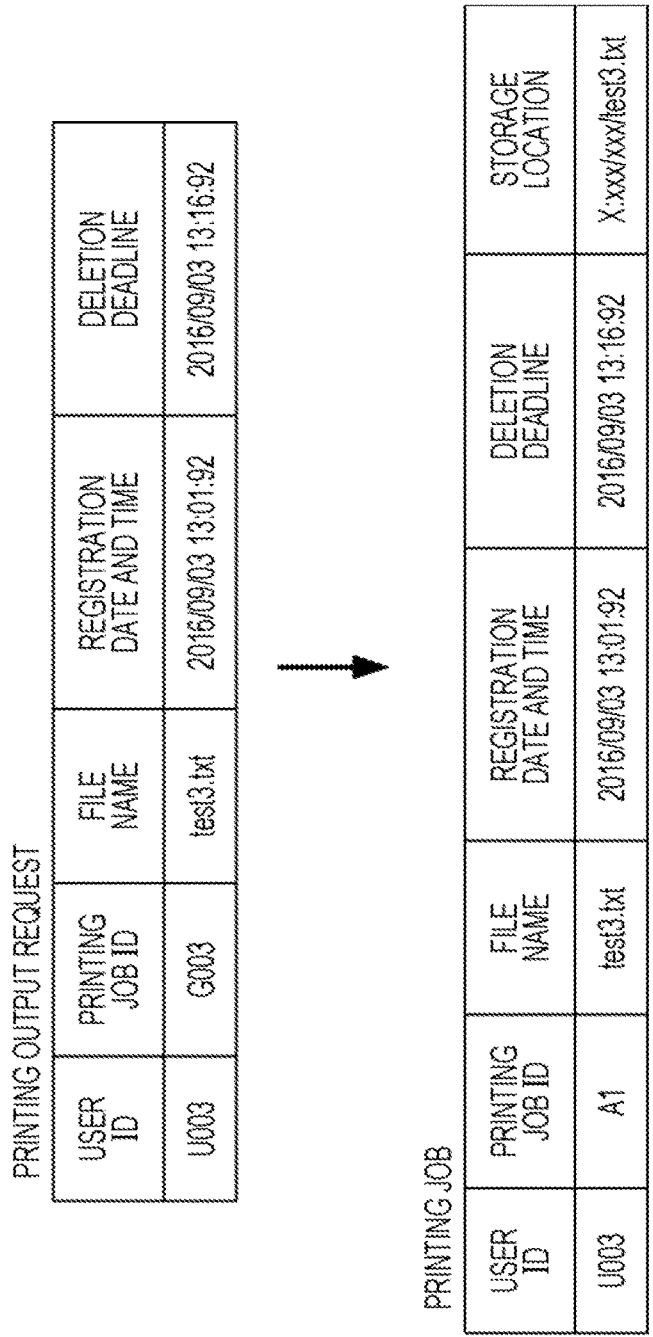
FIG. 11 is an example of a printing job stored by a printer.

FIG. 11 is an example of a printing job stored by the printer control unit 21 of the output printer 4 in the printer storage unit 27. The printer communication unit 26 of the output printer 4 receives the printing output request transmitted from the server 3.

The printer control unit 21 adds the printing job ID managed by the output printer 4 to the received printing output request, and stores the received printing output request in a predetermined storage region of the printer storage unit 27 as a printing job.

The printing jobs stored in the printer storage unit 27 are printing jobs to be managed by the printer 4 and are different from the printing jobs stored in the server storage unit 18 of the server 3. Other printing jobs based on printing output requests received from the terminals 2 may be stored in the output printer 4 as well as printing jobs based on printing output requests received from the server 3.

Therefore, the printer control unit 21 adds an individual printing job ID of the printer 4 to the printing output request and manages the printing job ID as a printing job. When the printer control unit 21 adds an individual printing job ID of the printer 4 to the printing output request, there is no association between the printing job ID managed by the printer 4 and the printing job ID managed by the server 3.

FIG. 12 is an example of a printing job table stored in the printer storage unit 27. Each record in the printing job table represents an abovementioned printing job. The example in FIG. 12 indicates that the deletion deadline corresponding to the printing job ID "A5"is not set.

For example, the server 3 may not set a deletion deadline in the printing output request to be transmitted to the printer 4. If the deletion time period is not set in the printing output request, information of the deletion deadline is not stored under the heading of the deletion deadline in the printing job table.

The deleting unit 22 deletes a printing job that has passed the deletion deadline from among the printing jobs stored in the printer storage unit 27. For example, the present time is assumed to be "2016/10/01 12:18:00".

The printing job having the printing job ID "A1"(shaded printing job in FIG. 12) has passed the deletion deadline among the printing jobs in the printing job table in FIG. 12. Therefore, the printing job having the printing job ID "A1"(the printing job including the printing data having the file name of "test11.txt") is promptly deleted at the point in time of the above present time by the deleting unit 22.

Next, a printing instruction operation performed by the user corresponding to the user ID "001"on the terminal 2 is explained. After accepting the printing instruction operation, the terminal 2 transmits the printing output request based on the printing instruction operation. The output printer 4 is not specified in the printing output request.

The specifying unit 12 of the server 3 specifies a target output printer 4 to which the printing output request received from the terminal 2 is to be transmitted. The setting unit 13 sets the deletion time period in the printing output request. The transmission control unit 15 transmits the printing output request for which the deletion time period is set to the output printer 4 specified by the specifying unit 12. Further, the transmission control unit 15 holds the data of the printing output request in the server storage unit 18.

The printer control unit 21 of the output printer 4 stores the received printing output request in the printer storage unit 27 as a printing job. The server 3 specifies the output printer 4 and sets the deletion deadline in response to receiving the printing output request from the terminal 2, and transmits the printing output request to the output printer 4.

The user uses the terminal 2 to perform a printing instruction operation and performs the printing execution operation with the output printer 4. At the point in time that the user performs the printing execution operation with the output printer 4, the printing output request is already stored in the printer storage unit 27 of the output printer 4.

Therefore, when the above printing execution operation is performed with respect to the output printer 4, the output printer 4 performs the printing based on the printing output request stored in the printer storage unit 27 without acquiring the printing output request from outside. Therefore, the time period from when the terminal accepts the printing execution operation until the printing is performed by the output printer 4 is shortened.

When the user corresponding to the user ID "001"performs the printing execution operation with the output printer 4, near field wireless communication, for example, may be performed with a card reader provided on the output printer 4 and a non-contact type card held by the user.

When near field wireless communication is performed, the recognizing unit 23 performs user recognition to recognize that the user is a user having suitable permission, and the recognizing unit 23 recognizes the user ID "001"of the user.

When the recognizing unit 23 recognizes the user ID "001", the printer control unit 21 controls the transmission, to the server 3, of a printing job list acquisition demand for acquiring a list of the printing output requests corresponding to the user ID "001"and transmitted to the output printer 4.

Based on the above control, the printer communication unit 26 transmits the printing job list demand to the server 3.

The user ID is included in the printing job list acquisition demand. The server control unit 11 in the server 3 refers to the printing job management table and the printing log table stored in the server storage unit 18 and specifies the registration date and time and the file name of the printing output request corresponding to the user ID and the output printer 4.

The retransmission control unit 16 controls the transmission of the printing job list including the above user ID and the specified registration date and time and file name, to the output printer 4 that is the source of the demand. The output printer 4 receives the printing job list. The printer control unit 21 controls the display of the information based on the printing job list on the touch panel display 28.

Figures 13, 14:
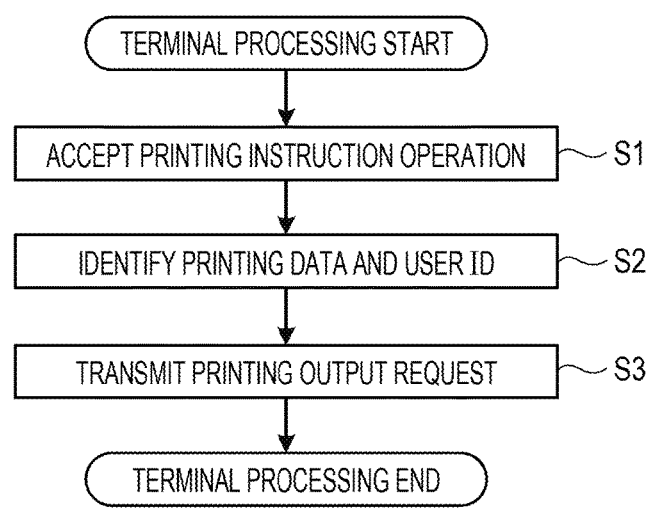
FIG. 13 is an example of a screen displayed on a touch panel display.
FIG. 14 is a flow chart illustrating an example of a processing flow performed by a terminal.

FIG. 13 is an example of a screen displayed by the touch panel display 28. The registration date and time, the file name and the user ID are displayed on the touch panel display 28 for each printing output request based on the above printing job list.

In the example in FIG. 13, a touch operation is performed, for example, in the region corresponding to the file name "test11.txt" on the touch panel display 28. The printer control unit 21 accepts the touch operation and recognizes that a printing execution operation for printing the printing data of the file name "test11.txt" has been performed.

At the point in time that the printing execution operation is performed, the printing data of the file name "test11.txt" has been deleted from the printer storage unit 27 because the time period set with the deletion time period has elapsed as indicated above.

Therefore, the printing data of the above file name is not present in the printer storage unit 27 even if the output printer 4 attempts to read and print the printing data of the above file name from the printer storage unit 27.

If the printing output request including the printing data to be printed is deleted from the output printer 4, the retransmission requesting unit 24 controls the transmission, to the server 3, of a retransmission demand for requesting the retransmission of the printing output request corresponding to the printing data of the file name "test11.txt". The printer communication unit 26 transmits the retransmission demand including the file name "test11.txt" to the server 3.

The server communication unit 17 of the server 3 receives the above retransmission demand. The server 3 receives the above retransmission demand for demanding the retransmission of the printing output request corresponding to the file name "test11.txt" later than the point in time that the printing output request was prescribed.

In this case, the retransmission control unit 16 refers to the printing job management table stored in the server storage unit 18 and acquires the printing data of the file name "test11.txt" from the storage location of the file name "test11.txt".

The retransmission control unit 16 controls the transmission of the printing output request including the printing data of the file name "test11.txt" to the output printer 4 that is the source of the retransmission demand. The server communication unit 17 transmits the printing output request to the output printer 4.

The printer communication unit 26 of the output printer 4 receives the printing output request including the printing data of the file name "test11.txt". The printer control unit 21 controls the printing of the printing data of the file name "test11.txt". The printing data is printed based on the above controls.

Therefore, at the point in time that the printing execution operation is performed on the output printer 4, the output printer 4 is able to acquire the printing output request to be printed from the server 3 even if the printing output request that is the subject of the printing execution operation has been deleted from the printer storage unit 27.

In the above case, the printing data is printed by the output printer 4 based on the printing output request deleted from the printer storage unit 27 without the user using the terminal 2 to perform the printing instruction operation again.

Therefore, even if a time-related deletion condition is set in the printing output request to be transmitted from the server 3 to the output printer 4, convenience for the user is improved because the user is not expected to perform the printing instruction operation again.

In the above case, there is a possibility that the printer 4 uses an individual deletion function of the printer 4 to periodically delete the printing output request from the printer storage unit 27. When the printing output requests are periodically deleted, time-related deletion conditions may not be set in the printing output request to be transmitted from the server 3 to the output printer 4.

However as indicated above, the printer 4 may receive the printing output request from the terminal 2 and not only from the server 3. The deletion deadline may not be set in the printing output request received from the terminal 2.

When the printing output requests are periodically deleted from the printer storage unit 27, there is a possibility that a printing output request received from the terminal 2 and in which the deletion deadline has not been set, may be deleted. When the printing output request received from the terminal 2 and not having the deletion deadline set therein is deleted, the convenience of the user contrarily decreases.

Furthermore, it is difficult for the server 3 to periodically delete the printing output requests from the printer storage unit 27 of the output printer 4 based on the printing job ID.

As indicated above, there is no relationship between the printing job IDs managed by the server 3 and the printing job IDs managed by the printers 4.

(Examples of Processing Flows of Embodiment)

Hereinbelow, processing flows of the embodiment will be explained with reference to flowcharts. FIG. 14 is a flow chart of an example of a processing flow of the terminal 2. The terminal 2 accepts the printing instruction operation (step S1).

The terminal 2 specifies the user ID of the user that operates the terminal 2 and specifies the printing data based on the printing instruction operation (step S2). The terminal 2 transmits the printing output request including the printing data and the user ID to the server 3 (step S3).

Figure 15:
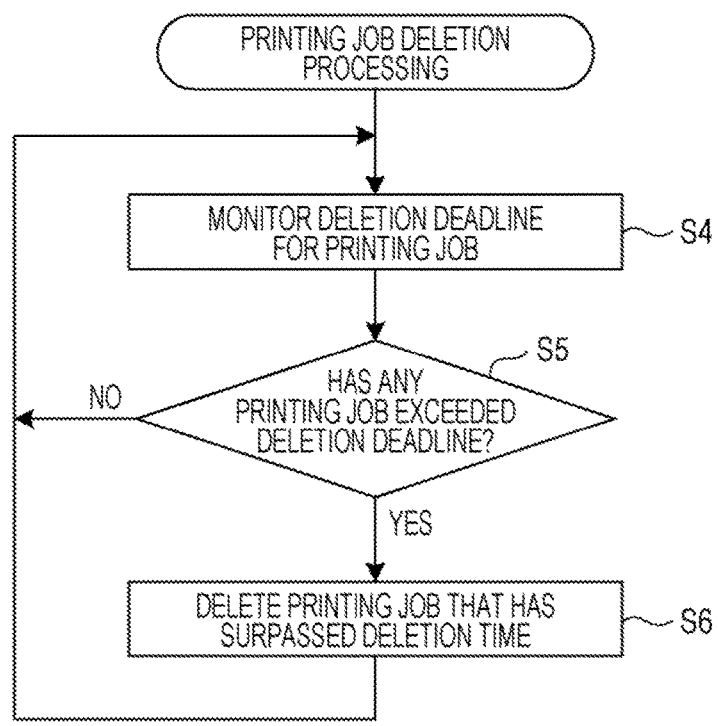
FIG. 15 is a flow chart illustrating an example of a printing job deletion processing flow.

FIG. 15 is a flow chart of an example of printing job deletion processing for deletion of a printing job by the deleting unit 22 of the printer 4. The deleting unit 22 monitors the printing job table stored in the printer storage unit 27 (step S4).

The deleting unit 22 determines whether there is a printing job that has surpassed the deletion deadline from the printing job table (step S5). If the determination in step S5 is "Yes", the deleting unit 22 deletes the printing job that has surpassed the deletion deadline from the printer storage unit 27 (step S6). If the determination in step S5 is "No", the processing returns to step S4. The processing returns to step S4 after the processing of step S6.

Figure 16:
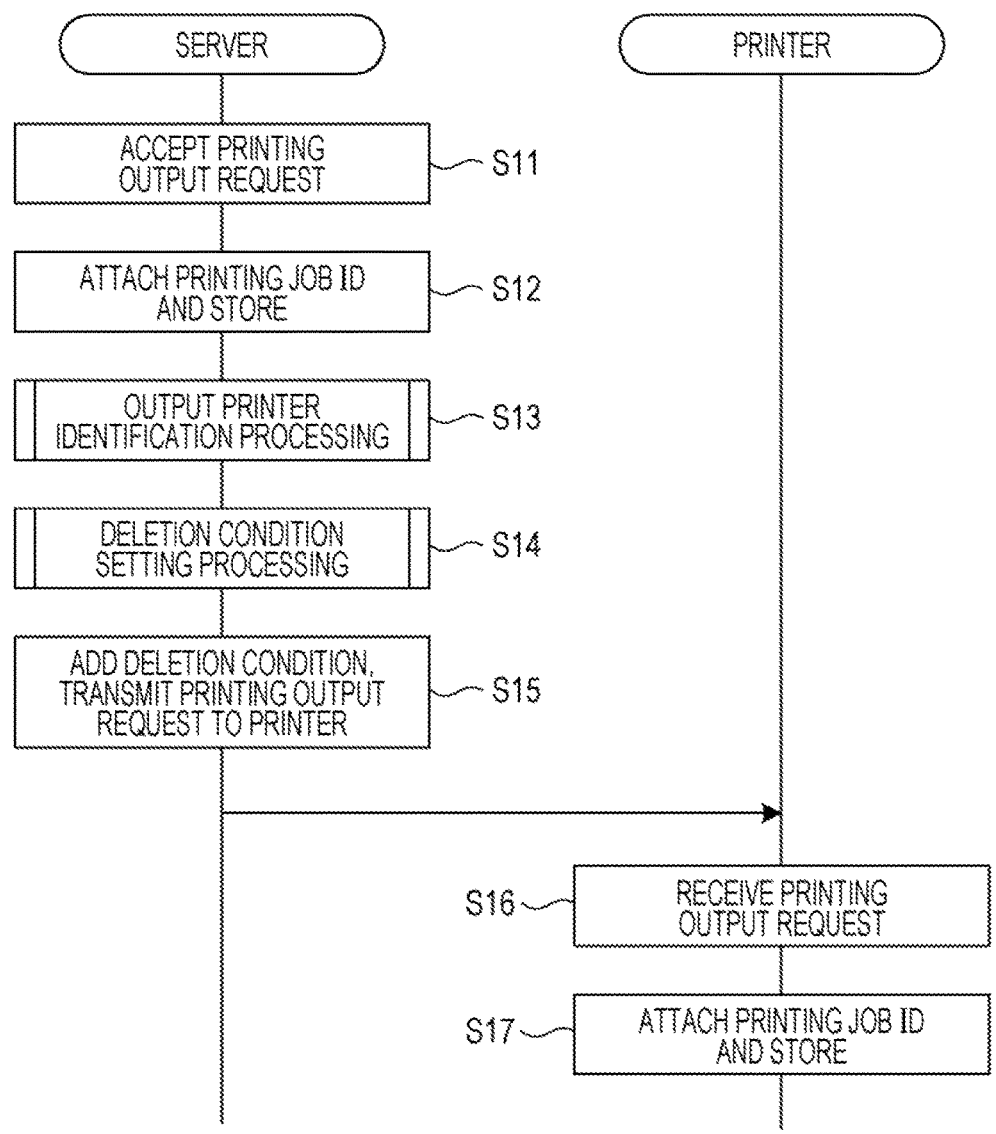
FIG. 16 is a sequence diagram illustrating an example of a processing flow by a server and a printer.

FIG. 16 is a sequence diagram of an example of processing by the server 3 and the printer 4. The server communication unit 17 of the server 3 accepts a printing output request from the terminal 2 (step S11). The server control unit 11 attaches a printing job ID to the received printing output request and stores the printing output request in the server storage unit 18 (step S12).

The specifying unit 12 specifies the output printer 4 based on the various types of the abovementioned output printer specification processing (step S13). The setting unit 13 sets the time-related deletion condition in the printing output request based on the various types of the abovementioned deletion condition setting processing (step S14).

The transmission control unit 15 controls the transmission of the printing output request to which the time-related deletion condition has been added, to the specified output printer 4. Based on the control, the server communication unit 17 transmits the printing output request to the specified output printer 4 (step S15).

The printer communication unit 26 of the output printer 4 receives the printing output request transmitted from the server 3 (step S16). The printer control unit 21 adds the individual printing job ID of the output printer 4 to the received printing output request and stores the printing output request in the printer storage unit 27 (step S17).

Figure 17:
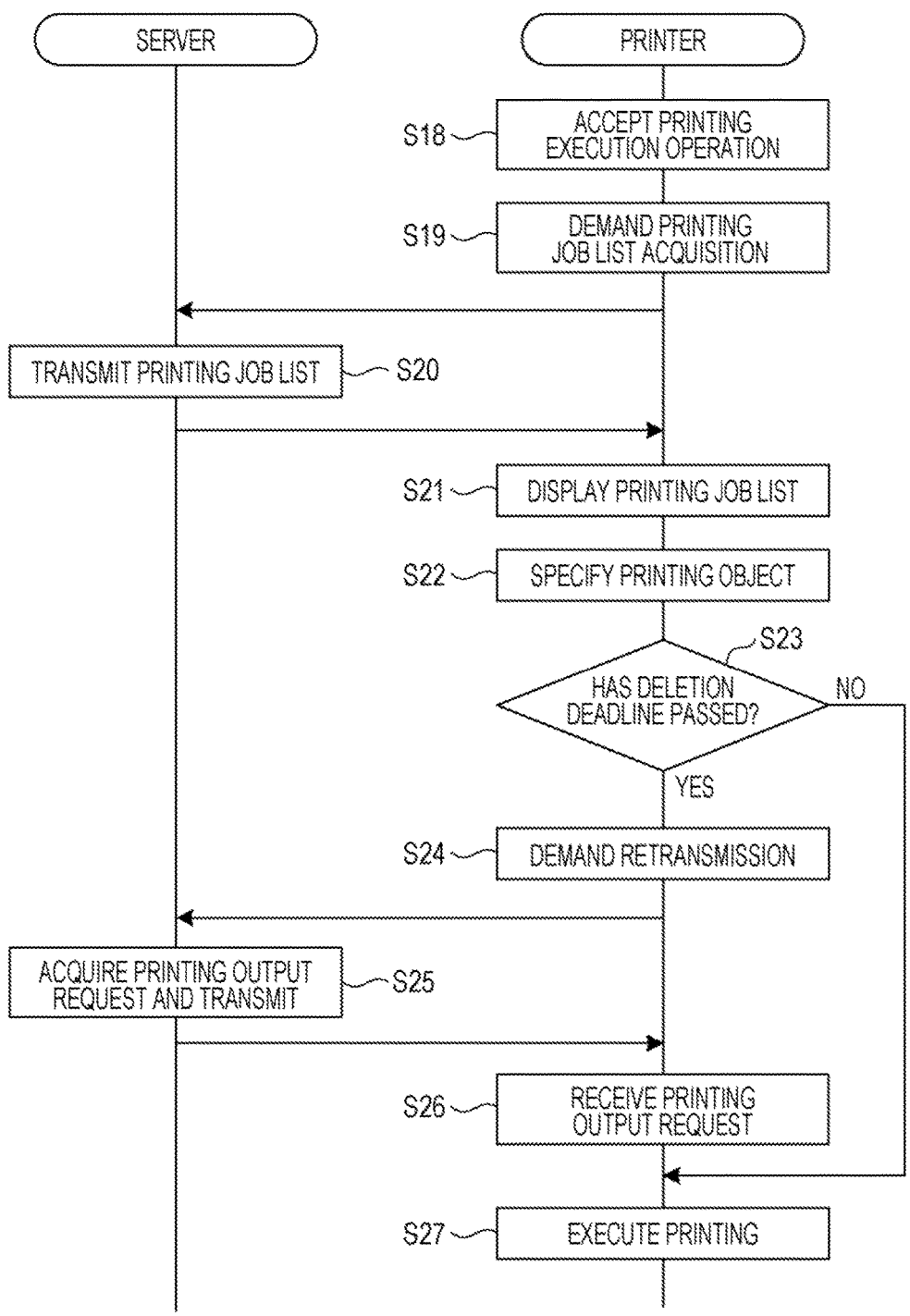
FIG. 17 is a sequence diagram illustrating an example of a processing flow by a server and a printer.

The processing from step S18 onward is explained with reference to FIG. 17. When the printing execution operation is performed on the touch panel display 28 of the output printer 4, the printer control unit 21 accepts the printing execution operation (step S18).

If the printing data to be printed is deleted from the printer storage unit 27 due to the passing of the deletion deadline, the retransmission requesting unit 24 controls the transmission, to the sever 3, of a demand for acquiring the printing job list. Based on the above control, the printer communication unit 26 transmits the printing job list demand to the server 3 (step S19).

Information that specifies the user ID is included in the printing job list acquisition demand. The retransmission control unit 16 refers to the tables stored in the server storage unit 18, specifies one or a plurality of printing output requests corresponding to the user ID and acquires the registration date and time and the file name.

If a plurality of printing output requests are specified, the retransmission control unit 16 refers to the tables stored in the server storage unit 18, and acquires the registration date and time and the file name corresponding to each of the plurality of printing output requests from the server storage unit 18.

The retransmission control unit 16 transmits the printing job list including the user ID and the acquired registration date and time and file name, to the output printer 4 that transmitted the printing job list acquisition demand (step S20).

The printer control unit 21 controls the display of the contents of the received printing job list on the touch panel display 28. Based on the above control, the contents of the printing job list are displayed on the touch panel display 28 (step S21).

When a touch operation corresponding to a region corresponding to any of the printing jobs is performed among the printing jobs displayed on the touch panel display 28, the printer control unit 21 specifies the printing output request to be printed based on the touch operation (step S22).

If the deletion deadline prescribed in the printing output request to be printed has passed (Yes in step S23), the printing output request is deleted from the printer storage unit 27.

The retransmission requesting unit 24 controls the retransmission of the retransmission demand including the file name of the deleted printing output request, to the server 3. Based on the above control, the printer communication unit 26 transmits the retransmission demand to the server 3 (step S24).

The retransmission control unit 16 of the server 3 refers to the tables stored in the server storage unit 18, acquires the printing output request corresponding to the file name included in the retransmission demand, from the server storage unit 18, and controls the transmission of the acquired printing output request to the output printer 4. Based on the above control, the server communication unit 17 transmits the printing output request to the output printer (step S25).

The printer communication unit 26 receives the printing output request (step S26). The printer control unit 21 executes the printing based on the received printing output request (step S27). If the determination in step S23 in "No", the deletion deadline set (prescribed) in the printing output request to be printed has not passed. Therefore, the printer control unit 21 executes the printing based on the printing output request stored in the printer storage unit 27.

Figure 18A:
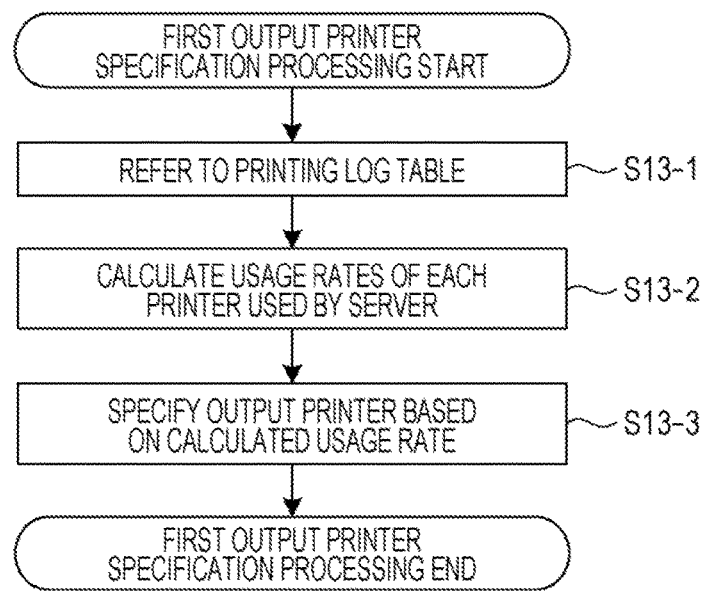
FIG. 18A and 18B are flow charts each illustrating an example of an output printer specification processing flow.

Next, the first output printer specification processing will be explained with reference to the flowchart exemplified in FIG. 18(A). The specifying unit 12 refers to the printing log table stored in the server storage unit 18 (step S13-1).

The specifying unit 12 calculates the usage rates of the printers 4 based on the headings corresponding to the output target printer among the records in the printing log table (step S13-2). The specifying unit 12 specifies the output printer 4 based on the calculated usage rates (step S13-3). The specifying unit 12 may specify the printer 4 having the highest usage rate among the printers 4 as the output printer.

Figure 18B:
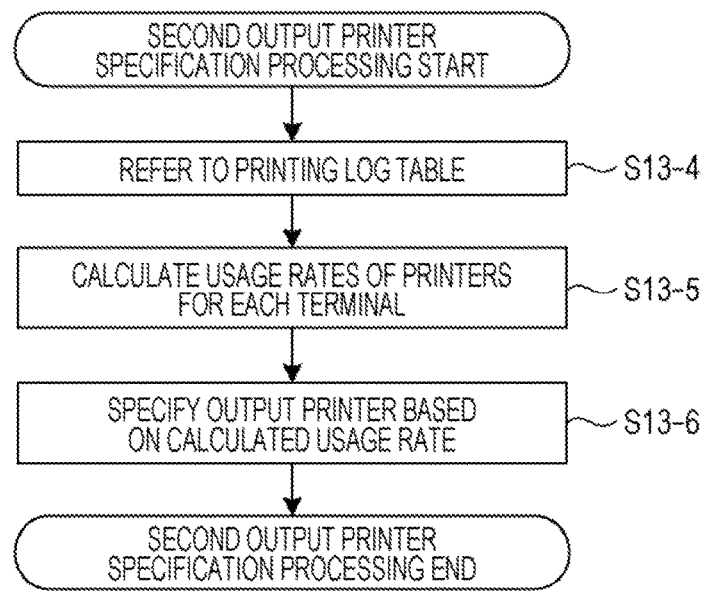

Next, the second output printer specification processing will be explained with reference to the flowchart exemplified in FIG. 18(B). The specifying unit 12 refers to the printing log table stored in the server storage unit 18 (step S13-4).

The specifying unit 12 calculates the usage rates of the printers 4 for each terminal 2 based on the heading of the client IP of the terminal 2 (step S13-5). The specifying unit 12 specifies the output printer 4 based on the calculated usage rates (step S13-6). The specifying unit 12 may specify the printer 4 having the highest usage rate among the printers 4 as the output printer.

Figure 19A:
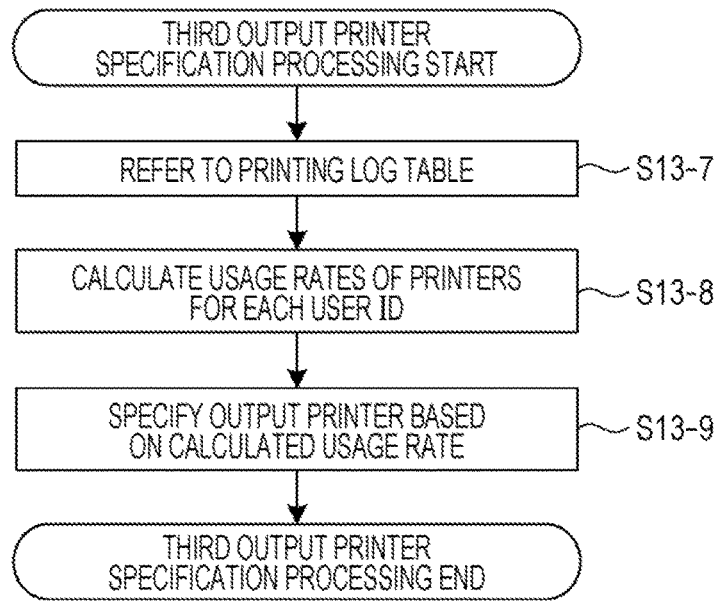
FIG. 19A and 19B are flow charts each illustrating an example of an output printer specification processing flow.

Next, the third output printer specification processing will be explained with reference to the flowchart exemplified in FIG. 19(A). The specifying unit 12 refers to the printing log table stored in the server storage unit 18 (step S13-7).

The specifying unit 12 calculates the usage rates of the printers 4 for each user ID based on the heading of the user ID of the terminal 2 (step S13-8). The specifying unit 12 specifies the output printer 4 based on the calculated usage rates (step S13-9). The specifying unit 12 may specify the printer 4 having the highest usage rate among the printers 4 as the output printer.

Figure 19B:
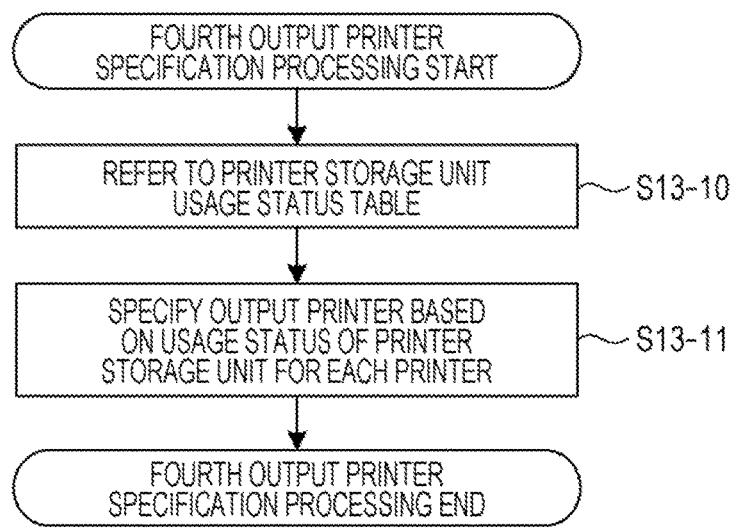

Next, the fourth output printer specification processing will be explained with reference to the flowchart exemplified in FIG. 19(B). The specifying unit 12 refers to the printer storage unit usage status table stored in the server storage unit 18 (step S13-10).

The specifying unit 12 specifies the output printer 4 based on the usage status of the printer storage units 27 in each printer 4 (step S13-11). The specifying unit 12 may specify the printer 4 having the lowest usage rate of the printer storage unit 27 among the printers 4 as the output printer.

Figure 20A:
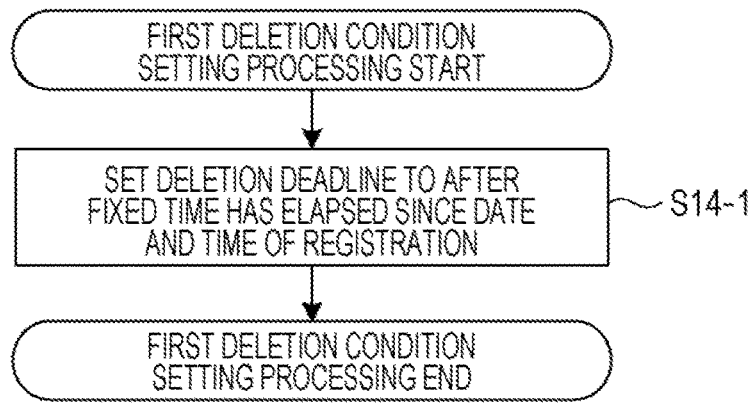
FIG. 20A and 20B are flow charts each illustrating an example of a deletion condition setting processing flow.

Next, the first deletion condition setting processing will be explained with reference to the flowchart exemplified in FIG. 20(A). The setting unit 13 sets the deletion condition for which the deletion deadline serves as a fixed time period that has elapsed since the registration date and time, in the printing output request to be transmitted to the specified output printer 4 (step 514-1).

Figure 20B:
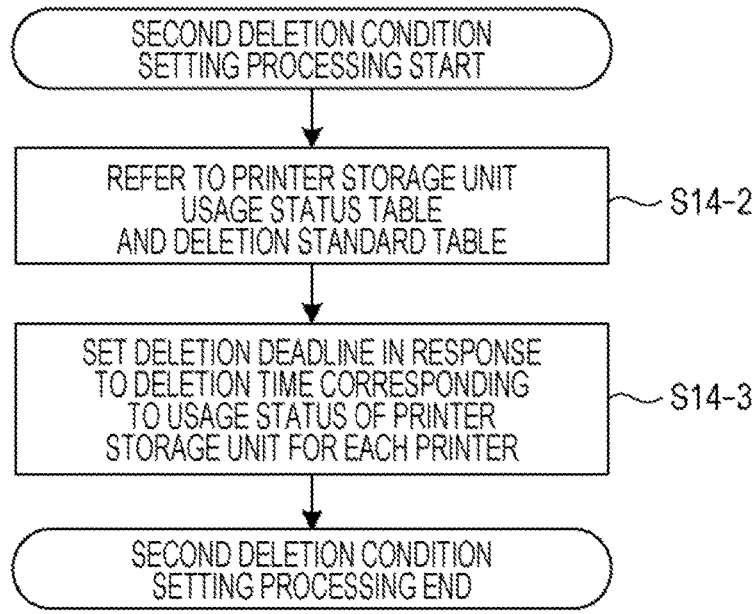

Next, the second deletion condition setting processing will be explained with reference to the flowchart exemplified in FIG. 20(B). The setting unit 13 refers to the printer storage unit usage status table and a deletion standard table stored in the server storage unit 18 (step S14-2).

The setting unit 13 sets the deletion deadline in response to the deletion time period corresponding to the usage status of the printer storage unit 27 in each printer 4 (step S14-3). The setting unit 13 may set the deletion deadline with the shortest time period in the printing output request to be transmitted to the printer 4 for which the usage rate of the printer storage unit 27 is the highest, or may set the deletion deadline with the longest time period in the printing output request to be transmitted to the printer 4 for which the usage rate of the printer storage unit 27 is the lowest.

Figure 21:
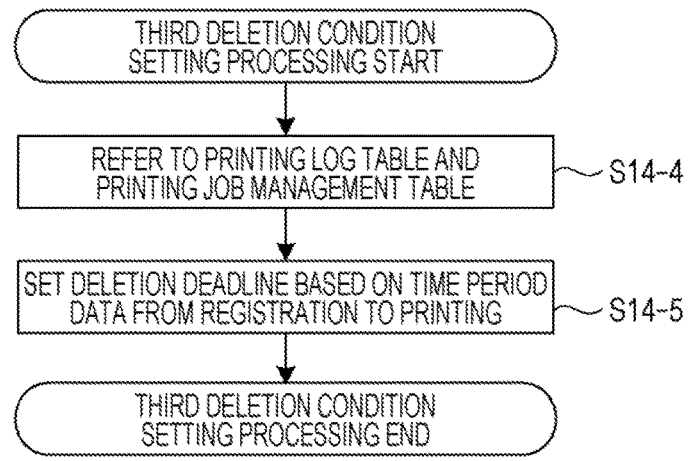
FIG. 21 is a flow chart illustrating an example of a deletion condition setting processing flow.

Next, the third deletion condition setting processing will be explained with reference to the flowchart exemplified in FIG. 21. The setting unit 13 refers to the printing log table and the printing job table (step S14-4). The setting unit 13 obtains the first extraction data which is the specified record of a user ID, from the printing log table. The setting unit 13 obtains the second extraction data which is the specified record of a user ID, from the printing job management table.

The setting unit 13 associates the first extraction data and the second extraction data with the printing job IDs and obtains the time period data from registration until printing. The time period data from registration until printing corresponds to the user ID associated with the printing output request.

The setting unit 13 sets the deletion deadline in the printing output request based on the time period from registration until printing among the above time period data (step 514-5). If a plurality of records are included in the above time period data, the setting unit 13 may set an average value of the time periods from registration until printing of the records as the deletion deadline.

Figure 22:
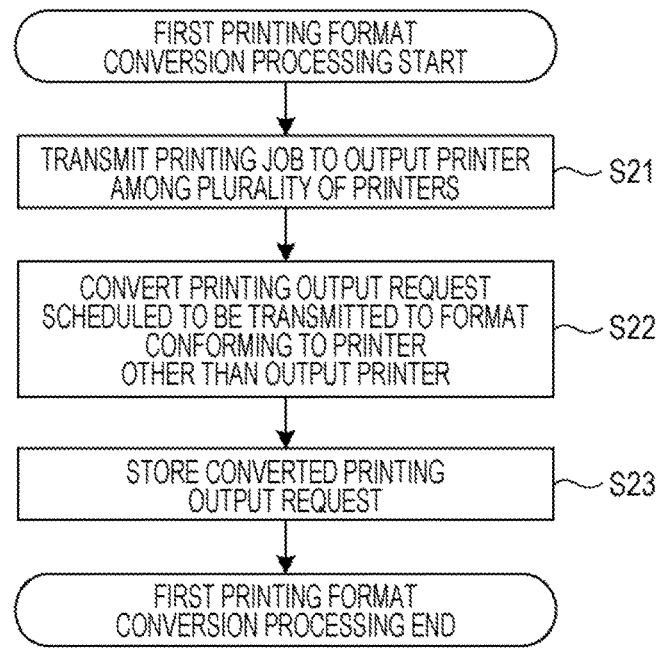
FIG. 22 is a flow chart illustrating an example of a printing format conversion processing flow.

Next, an example of first printing format conversion processing will be explained with reference to the flow chart in FIG. 22. The data format of the printing output request transmitted by the terminal 2 to the server 3 may be different from the data format that can be interpreted by the output printer 4.

If the data formats are different, the output printer 4 receives the printing output request from the server 3 and then converts the printing output request to the data format conforming to the output printer 4, and performs printing based on the converted printing output request. Therefore, the conversion processing of the data format takes time until the printing is performed by the output printer 4.

As indicated above, the terminal 2 transmits the printing output request in which the output printer 4 is not specified to the server 3. Hereinbelow, the terminal 2 is assumed to transmit, to the server 3, a printing output request of an intermediate format data having a high versatility of interpretability among multiple types of printers 4.

The intermediate format data may be, for example, XML Paper Specification (XPS) which is based on the Extensible Markup Language (XML).

The converting unit 14 of the server 3 converts the printing output request of the intermediate format data received from the terminal 2 to a format that conforms to the output printer 4 specified by the specifying unit 12. For example, the converting unit 14 may convert the printing output request of the intermediate format data to printing data that corresponds to the printer 4 that is the printing output target. The printing format data may be, for example, Page Description Language (PDL).

In addition, the converting unit 14 may further convert the printing output request of the intermediate format data to an intermediate format data that conforms to the printer 4 that is the printing output target. For example, the intermediate format data may be data that has specific printing settings written in the intermediate format data received from the terminal 2.

For example, if a printing instruction based on the printing output request is performed on a plurality of printers 4 by the server 3, the transmission control unit 15 controls the transmission of the printing output request to a predetermined output printer 4 among the plurality of printers 4. Based on the control, the server communication unit 17 transmits the printing output request to the predetermined output printer 4 (step S21).

The transmission control unit 15 may transmit a printing output request that is scheduled to be transmitted to a printer 4 other than the predetermined output printer 4 among the plurality of printers 4. The converting unit 14 converts the printing output request that is scheduled to be transmitted to the format conforming to the printer 4 that is the transmission target (step S22). The converting unit 14 then stores the converted printing output request in the server storage unit 18 (step S23).

The printing output request scheduled to be transmitted is transmitted afterward from the server 3 to the printer 4. The server 3 previously converts the printing output request to a format conforming to the printer 4 that is the transmission target, whereby the time period for converting to the data format of the printing output request in the printer 4 is either saved or reduced. Therefore, the time period from when the printing instruction operation is performed until the printing is executed by the printer 4 is shortened.

Figure 23:
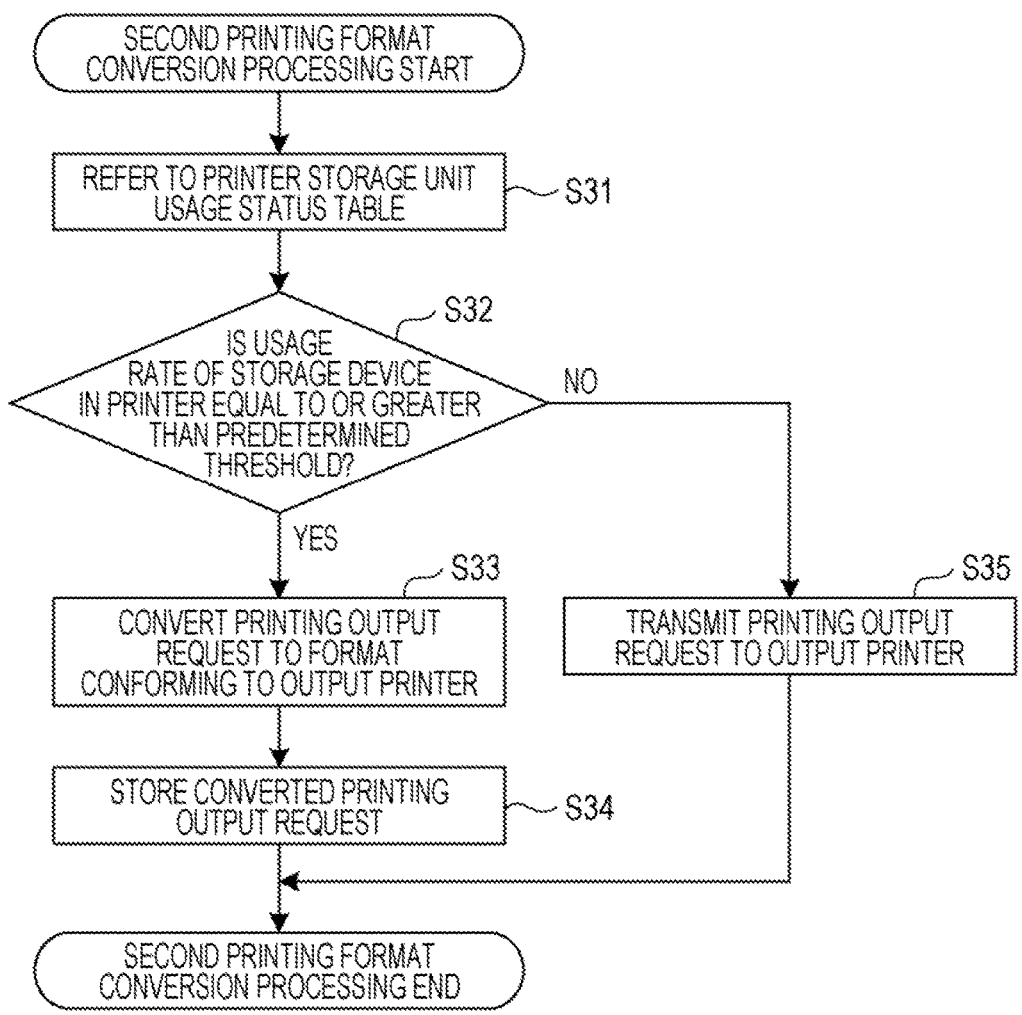
FIG. 23 is a flow chart illustrating an example of a printing format conversion processing flow.

Next, an example of second printing format conversion processing will be explained with reference to the flow chart in FIG. 23. The server control unit 11 refers to the printer storage unit usage status table stored in the server storage unit 18 (step S31) and acquires the information of the usage rate of the printer storage unit 27 in the output printer 4 specified by the specifying unit 12.

The server control unit 11 determines whether the acquired usage rate of the printer storage unit 27 in the output printer 4 is equal to or greater than a predetermined threshold (step S32). The threshold may be set to an optional value. For example, the threshold may be set to "90%".

If the usage rate is equal to or greater than the threshold, the accumulation load of the printer storage unit 27 in the output printer 4 is high. Therefore, if the determination in step S32 is "Yes", the converting unit 14 converts the printing output request to the format conforming to the output printer 4 (step S33) and the printing output request is stored in the server storage unit 18 (step S34).

If the determination in step S32 is "Yes", the transmission control unit 15 does not transmit the printing output request to the output printer 4 because it is assumed that the accumulation load of the output printer 4 is high. As indicated above, the server control unit 11 periodically collects information pertaining to the usage amounts of the printer storage units 27 from the printers 4.

The information of the usage amounts and the usage rates in the printer storage unit usage status table are updated based on the collected information pertaining to the usage amounts. The server control unit 11 may transmit the printing output request to the output printer 4 when the usage rate of the specified output printer 4 falls below the above threshold.

If the determination in step S32 is "No", the transmission control unit 15 transmits the printing output request to the specified output printer 4 because it is assumed that the accumulation load of the printer storage unit 27 in the output printer 4 is not high (step S35).

Therefore, if the accumulation load of the printer storage unit 27 in the output printer 4 is high, the server 3 does not transmit the printing output request to the output printer 4 and converts the data format of the printing output request. The server 3 then transmits the printing output request the data format of which has been converted to the output printer 4 when transmitting the printing output request to the output printer 4.

By transmitting the printing output request the data format of which has been converted to the output printer 4, the time taken to convert the data format of the printing output request in the output printer 4 is either saved or reduced. Therefore, the time period from when the terminal 2 accepts the printing execution operation until the printing is performed by the output printer 4 is shortened.

(Example of a Hardware Configuration of Server)

Figure 24:
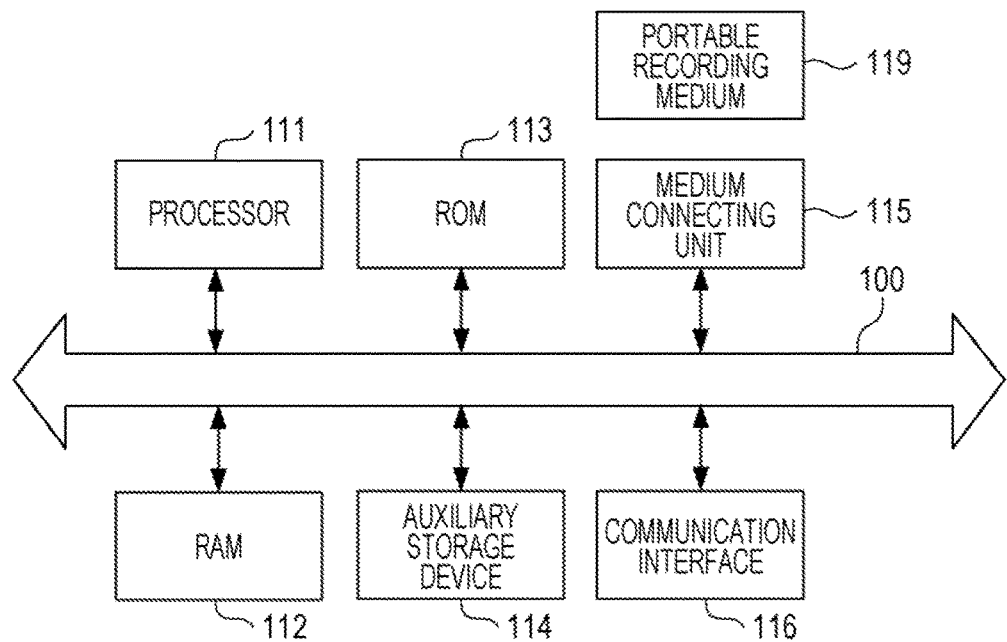
FIG. 24 is an example of a hardware configuration of a server.

Next, an example of a hardware configuration of the server 3 will be explained with reference to the example of FIG. 24. As exemplified in FIG. 24, a processor 111, a random access memory (RAM) 112, and a read only memory (ROM) 113 are connected to a bus 100.

An auxiliary storage device 114, a medium connecting unit 115, and a communication interface 116 are also connected to the bus 100. The processor 111 executes programs expanded in the RAM 112. The program for carrying out the processing of the present embodiment may be used as an executed program.

The ROM 113 is a non-volatile storage device for storing the programs expanded in the RAM 112. The auxiliary storage device 114 is a storage device for storing various types of information, and a semiconductor memory and the like, for example, may be used as the auxiliary storage device 114. The medium connecting unit 115 is provided to enable connection with a portable recording medium 119.

A portable memory may be used as the portable recording medium 119. The program for carrying out the processing of the present embodiment may be recorded on the portable recording medium 119.

The server storage unit 18 in the server 3 may be realized by the RAM 112 or the auxiliary storage device 114 and the like. The server communication unit 17 may be realized by the communication interface 116.

The server control unit 11, the specifying unit 12, the setting unit 13, the converting unit 14, the transmission control unit 15, and the retransmission control unit 16 may be realized by the processor 111 executing a given program.

The RAM 112, the ROM 113, the auxiliary storage device 114, and the portable recording medium 119 are all examples of tangible computer-readable storage media. These tangible storage media are not temporary media such as a signal carrier wave.

(Example of a Hardware Configuration of Printer)

Figure 25:
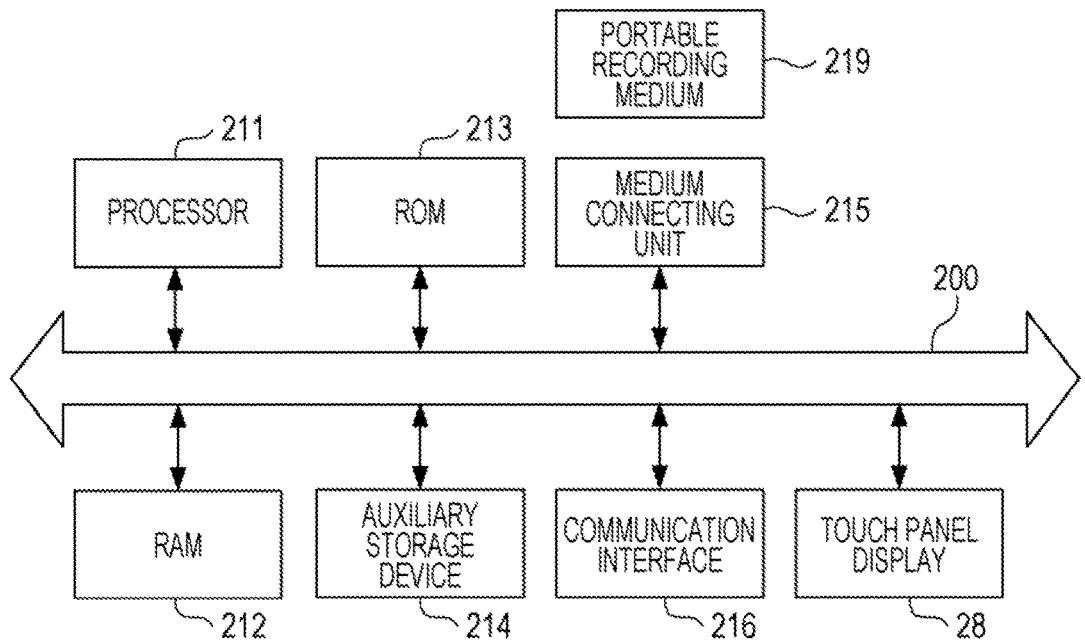
FIG. 25 is an example of a hardware configuration of a printer.

Next, an example of a hardware configuration of the printer 4 will be explained with reference to the example of FIG. 25. As exemplified in FIG. 25, a processor 211, a RAM 212, and a ROM 213 are connected to a bus 200.

In addition, an auxiliary storage device 214, a medium connecting unit 215, a communication interface 216, and the touch panel display 28 are connected to the bus 200. The processor 211 executes programs expanded in the RAM 212. The program for carrying out the processing of the present embodiment may be used as an executed program.

The ROM 213 is a non-volatile storage device for storing the programs expanded in the RAM 212. The auxiliary storage device 214 is a storage device for storing various types of information, and a hard disk drive or a semiconductor memory and the like may be used as the auxiliary storage device 214. The medium connecting unit 215 is provided to enable connection with a portable recording medium 219.

A portable memory or an optical disk and the like may be used as the portable recording medium 219. A program for performing the processing of the embodiment may be recorded on the portable recording medium 219.

The printer storage unit 27 may be realized by the RAM 212 or the auxiliary storage device 214 and the like. The printer communication unit 26 may be realized by the communication interface 216. The printer control unit 21, the deleting unit 22, the recognizing unit 23, the retransmission requesting unit 24, and the usage amount acquiring unit 25 may be realized by the processor 211 executing a given program.

The RAM 212, the ROM 213, the auxiliary storage device 214, and the portable recording medium 219 are all examples of tangible computer-readable storage media. These tangible storage media are not temporary media such as a signal carrier wave.

(Example of Hardware Configuration of the Terminal)

Figure 26:
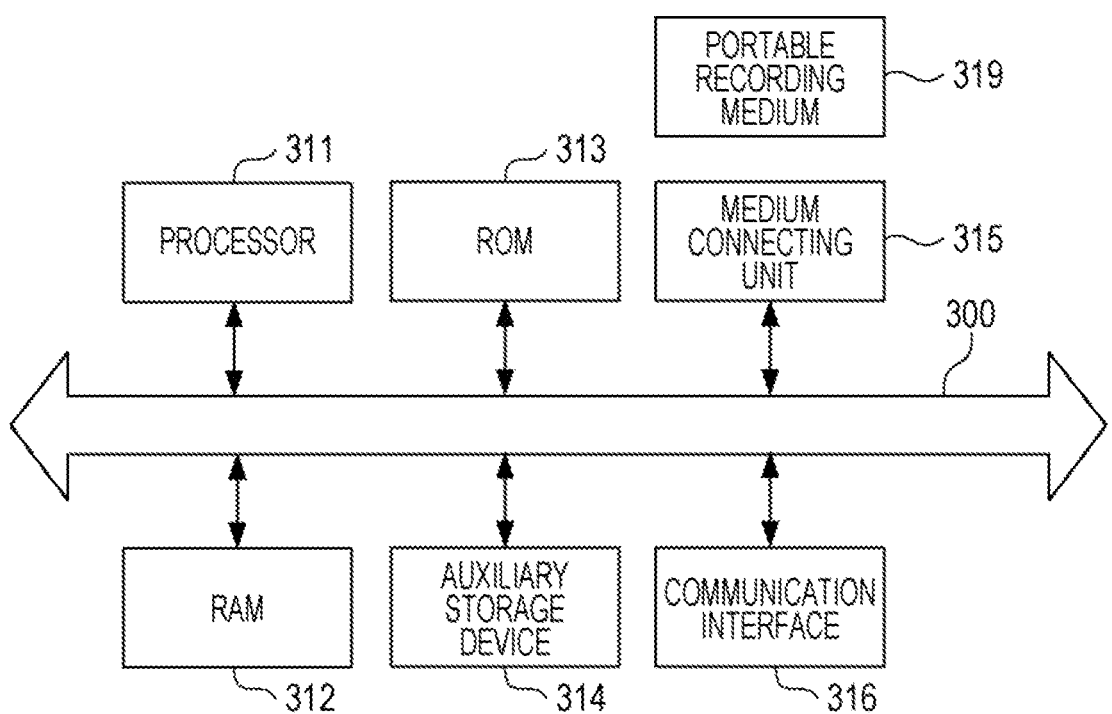
FIG. 26 is an example of a hardware configuration of a terminal.

Next, an example of a hardware configuration of the terminal 2 will be explained with reference to the example of FIG. 26. As exemplified in FIG. 26, a processor 311, a RAM 312, and a ROM 313 are connected to a bus 300.

In addition, an auxiliary storage device 314, a media connecting unit 315, and a communication interface 316 are also connected to the bus 300. The processor 311 executes programs expanded in the RAM 312. The program for carrying out the processing of the present embodiment may be used as an executed program.

The ROM 313 is a non-volatile storage device for storing the programs expanded in the RAM 312. The auxiliary storage device 314 is a storage device for storing various types of information, and a hard disk drive or a semiconductor memory and the like may be used as the auxiliary storage device 314. The medium connecting unit 315 is provided to enable connection with a portable recording medium 319.

A portable memory or an optical disk and the like may be used as the portable recording medium 319. The program for carrying out the processing of the present embodiment may be recorded on the portable recording medium 319.

If the terminal 2 is a thin client terminal, the auxiliary storage device 314 and the medium connecting unit 315 may not be connected to the bus 300.

The RAM 312, the ROM 313, the auxiliary storage device 314, and the portable recording medium 319 are all examples of tangible computer-readable storage media. These tangible storage media are not temporary media such as a signal carrier wave.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable recording medium having stored therein a program that causes a computer to execute a process, the process comprising:
   receiving a printing output request from a terminal, the printing output request requesting to print output data without specifying a printer to be used;
   transmitting the printing output request to a specific printer in association with a time-related deletion condition to cause the specific printer to delete the printing output request from a first memory of the specific printer when a time period set in the time-related deletion condition is exceeded; and
   retransmitting the printing output request to the specific printer when a retransmission request for requesting retransmission of the printing output request is received from the specific printer.

2. The non-transitory computer-readable recording medium according to claim 1, the process further comprising:
   transmitting the printing output request to the specific printer later than a point in time prescribed in the time-related deletion condition.

3. The non-transitory computer-readable recording medium according to claim 1, the process further comprising:
   storing output history information which indicates a history of a plurality of printers to which the computer transmits printing output requests; and
   specifying the specific printer among the plurality of printers based on the output history information.

4. The non-transitory computer-readable recording medium according to claim 3, the process further comprising:
   calculating usage rates of the respective printers used by the computer based on the output history information; and
   specifying the specific printer based on the calculated usage rates.

5. The non-transitory computer-readable recording medium according to claim 4, the process further comprising:
   specifying, as the specific printer, a printer having a highest usage rate among the usage rates calculated for the respective printers.

6. The non-transitory computer-readable recording medium according to claim 3, wherein
   the output history information indicates from which terminal among a plurality of terminals the respective printing output requests are received,
   the process further comprising:
   calculating, based on the output history information, usage rates of printers to which the printing output requests received from the respective terminals are transmitted; and
   specifying the specific printer based on the calculated usage rate.

7. The non-transitory computer-readable recording medium according to claim 6, the process further comprising:
   specifying, as the specific printer, a printer having a highest usage rate among the usage rates calculated for the respective printers.

8. The non-transitory computer-readable recording medium according to claim 3, wherein
   the output history information indicates which user among a plurality of users logs in terminals from which the respective printing output requests are received,
   the process further comprising:
   calculating, based on the output history information, usage rates of printers to which the printing output requests, which are received from the terminals the respective users log in, are transmitted; and
   specifying the specific printer based on the calculated usage rate.

9. The non-transitory computer-readable recording medium according to claim 8, the process further comprising:
   specifying, as the specific printer, a printer having a highest usage rate, among the usage rates calculated for the respective printers.

10. The non-transitory computer-readable recording medium according to claim 3, the process further comprising:
    acquiring usage information pertaining to a usage status of the first memory from the respective printers; and
    specifying the specific printer based on the acquired usage information.

11. The non-transitory computer-readable recording medium according to claim 10, the process further comprising:
    specifying, as the specific printer, a printer having a lowest usage rate of the first memory among the plurality of printers, based on the acquired usage information.

12. The non-transitory computer-readable recording medium according to claim 1, the process further comprising:

converting the printing output request to a data format conforming to the specific printer.

13. The non-transitory computer-readable recording medium according to claim 1, wherein
the time period indicates a fixed time period elapsed from a time point when the computer receives the printing output request.

14. The non-transitory computer-readable recording medium according to claim 1, the process further comprising:
associating the time-related deletion condition with the printing output request, based on information pertaining to the usage status of the first memory of the specific printer.

15. The non-transitory computer-readable recording medium according to claim 1, the process further comprising:
setting the time period in the time-related deletion condition, based on a print time history indicating which user among a plurality of users logs in terminals from which the respective printing output requests are received and indicating, for each of the users, a history of time periods from time points when the computer receives the printing output requests until time points when the specific printer executes print processing in accordance with the respective printing output requests.

16. The non-transitory computer-readable recording medium according to claim 1, the process further comprising:
transmitting the printing output request to the specific printer when the printing output request accepted from the terminal is transmitted to a plurality of printers; and
converting printing output requests scheduled to be transmitted to printers other than the specific printer to formats conforming to the respective printers.

17. The non-transitory computer-readable recording medium according to claim 1, the process further comprising:
controlling whether to convert the printing output request to a format conforming to the specific printer, based on information pertaining to a usage status of the first memory of the specific printer.

18. The non-transitory computer-readable recording medium according to claim 1, the process further comprising:
storing the received printing output request in a second memory of the computer; and
retransmitting the printing output request stored in the second memory to the specific printer when the retransmission request is received from the specific printer.

19. A printing management method, comprising:
receiving, by a computer, a printing output request from a terminal, the printing output request requesting to print output data without specifying a printer to be used;
transmitting the printing output request to a specific printer in association with a time-related deletion condition to cause the specific printer to delete the printing output request from a first memory of the specific printer when a time period set in the time-related deletion condition is exceeded; and
retransmitting the printing output request to the specific printer when a retransmission request for requesting retransmission of the printing output request is received from the specific printer.

20. A printing management device, comprising:
a memory; and
a processor coupled to the memory and the processor configured to:
receive a printing output request from a terminal, the printing output request requesting to print output data without specifying a printer to be used;
transmit the printing output request to a specific printer in association with a time-related deletion condition to cause the specific printer to delete the printing output request from a first memory of the specific printer when a time period set in the time-related deletion condition is exceeded; and
retransmit the printing output request to the specific printer when a retransmission request for requesting retransmission of the printing output request is received from the specific printer.

* * * * *